(12) United States Patent
Wang et al.

(10) Patent No.: US 10,334,171 B2
(45) Date of Patent: *Jun. 25, 2019

(54) APPARATUS AND METHODS FOR STABILIZATION AND VIBRATION REDUCTION

(71) Applicant: SZ DJI OSMO TECHNOLOGY CO., LTD., Shenzhen (CN)

(72) Inventors: Tao Wang, Shenzhen (CN); Mingyu Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 48 days.

This patent is subject to a terminal disclaimer.

(21) Appl. No.: 15/280,516

(22) Filed: Sep. 29, 2016

(65) Prior Publication Data

US 2017/0171468 A1 Jun. 15, 2017

Related U.S. Application Data

(63) Continuation of application No. 14/984,348, filed on Dec. 30, 2015, now Pat. No. 9,485,427, which is a
(Continued)

(51) Int. Cl.
*H04N 7/18* (2006.01)
*H04N 5/232* (2006.01)
*H04N 5/225* (2006.01)
*B64C 39/02* (2006.01)
*B64D 47/08* (2006.01)
(Continued)

(52) U.S. Cl.
CPC ....... *H04N 5/23287* (2013.01); *B64C 39/024* (2013.01); *B64D 47/08* (2013.01); *G03B 15/006* (2013.01); *H04N 5/2252* (2013.01); *H04N 5/2253* (2013.01); *H04N 5/2254* (2013.01); *H04N 5/2328* (2013.01); *H04N 5/23258* (2013.01); *H04N 5/23293* (2013.01);
(Continued)

(58) Field of Classification Search
None
See application file for complete search history.

(56) References Cited

U.S. PATENT DOCUMENTS 3,085,354 A 4/1963 Rasmussen et al.
3,523,660 A 8/1970 Walter et al.
(Continued)

FOREIGN PATENT DOCUMENTS

CN 1435993 A 8/2003
CN 2689286 Y 3/2005
(Continued)

OTHER PUBLICATIONS

Mark Micire et al., "Multi-touch Interaction for Robot Control," IUI '09, Fed. 2009, Florida, JSA, pp. 425-428.
(Continued)

*Primary Examiner* — Mohammed S Rahaman
(74) *Attorney, Agent, or Firm* — Anova Law Group, PLLC

(57) ABSTRACT

The present invention provides an apparatus for stabilizing an imaging device and methods of using the same for a wide variety of applications including photography, video, and filming. Also provided are unmanned vehicles including aerial vehicles that contain the apparatus disclosed herein.

20 Claims, 12 Drawing Sheets

Related U.S. Application Data continuation of application No. 14/134,375, filed on Dec. 19, 2013, now Pat. No. 9,277,130, which is a continuation of application No. PCT/CN2013/084857, filed on Oct. 8, 2013.

(51) Int. Cl.
*H04N 5/341* (2011.01)
*G03B 15/00* (2006.01)

(52) U.S. Cl.
CPC ............ *H04N 5/3415* (2013.01); *H04N 7/185* (2013.01); *B64C 2201/127* (2013.01)

(56) References Cited

U.S. PATENT DOCUMENTS

| | | |
|---|---|---|
| 3,564,134 A | 2/1971 | Richard et al. |
| 3,617,016 A | 11/1971 | Emil |
| 3,638,502 A | 2/1972 | John et al. |
| 4,490,724 A | 12/1984 | Bickman |
| 4,752,791 A | 6/1988 | Allred |
| 5,124,938 A | 6/1992 | Algrain |
| 5,426,476 A | 6/1995 | Fussell et al. |
| 5,897,223 A | 4/1999 | Tritchew et al. |
| 5,900,925 A | 5/1999 | Navarro |
| 5,966,991 A | 10/1999 | Gosselin et al. |
| 6,191,842 B1 | 2/2001 | Navarro |
| 6,290,568 B1 | 9/2001 | Hou |
| 6,584,382 B2 | 6/2003 | Karem |
| 6,628,338 B1 | 9/2003 | Elberbaum et al. |
| 6,999,005 B2 | 2/2006 | Okada et al. |
| 7,000,883 B2 | 2/2006 | Mercadal et al. |
| 7,190,097 B2 | 3/2007 | Voigt et al. |
| 7,253,398 B2 | 8/2007 | Hughes et al. |
| 7,385,626 B2 | 6/2008 | Aggarwal et al. |
| 7,479,949 B2 | 1/2009 | Jobs et al. |
| 7,905,463 B2 | 3/2011 | Burnham et al. |
| 8,087,315 B2 | 1/2012 | Goossen et al. |
| 8,089,225 B2 | 1/2012 | Goossen |
| 8,089,694 B2 | 1/2012 | Wernersson et al. |
| 8,140,200 B2 | 3/2012 | Heppe et al. |
| 8,214,088 B2 | 7/2012 | Lefebure |
| 8,434,950 B1 | 5/2013 | Wawro |
| 8,473,125 B2 | 6/2013 | Rischmuller et al. |
| 8,474,761 B2 | 7/2013 | Callou |
| 8,485,740 B1 | 7/2013 | Chapman |
| 8,498,447 B2 | 7/2013 | Derbanne |
| 8,521,339 B2 | 8/2013 | Gariepy et al. |
| 8,523,462 B2 | 9/2013 | Dimotakis |
| 8,564,547 B2 | 10/2013 | Amireh et al. |
| 8,581,981 B2 | 11/2013 | Alley et al. |
| 8,600,432 B2 | 12/2013 | Krupnik |
| 8,635,938 B2 | 1/2014 | King et al. |
| 8,761,961 B2 | 6/2014 | Lee et al. |
| 8,861,947 B2 | 10/2014 | Webb et al. |
| 8,903,568 B1 | 12/2014 | Wang et al. |
| 8,908,090 B2 | 12/2014 | Webb |
| 8,934,023 B2 | 1/2015 | Webb et al. |
| 8,938,160 B2 | 1/2015 | Wang |
| 8,938,161 B2 | 1/2015 | Webb et al. |
| 9,144,748 B2 | 9/2015 | Krupnik |
| 9,277,130 B2 | 3/2016 | Wang et al. |
| 9,390,617 B2 | 7/2016 | Pettey et al. |
| 9,452,528 B1 | 9/2016 | Checka et al. |
| 9,485,427 B2 | 11/2016 | Wang et al. |
| 9,493,232 B2 | 11/2016 | Wang et al. |
| 9,547,380 B2 | 1/2017 | Parazynski |
| 9,589,458 B2 | 3/2017 | Krupnik |
| 9,648,240 B2 | 5/2017 | Wang et al. |
| 2001/0035490 A1 | 11/2001 | Mishima et al. |
| 2002/0100850 A1 | 8/2002 | Shental et al. |
| 2003/0201371 A1 | 10/2003 | Zadok |
| 2004/0173726 A1 | 9/2004 | Mercadal et al. |
| 2005/0185089 A1 | 8/2005 | Chapman |
| 2006/0017816 A1 | 1/2006 | Gat |
| 2006/0053912 A1 | 3/2006 | Miller |
| 2009/0051906 A1 | 2/2009 | Carter et al. |
| 2009/0096411 A1 | 4/2009 | Vanska et al. |
| 2009/0212157 A1 | 8/2009 | Arlton et al. |
| 2009/0283629 A1 | 11/2009 | Kroetsch et al. |
| 2010/0079101 A1 | 4/2010 | Sidman |
| 2010/0228406 A1 | 9/2010 | Hamke et al. |
| 2010/0250022 A1 | 9/2010 | Hines et al. |
| 2010/0266272 A1 | 10/2010 | Holway et al. |
| 2011/0054689 A1 | 3/2011 | Nielsen et al. |
| 2011/0221692 A1 | 9/2011 | Seydoux et al. |
| 2011/0221900 A1 | 9/2011 | Reich |
| 2011/0288696 A1 | 11/2011 | Lefebure |
| 2011/0299732 A1 | 12/2011 | Jonchery et al. |
| 2011/0301783 A1 | 12/2011 | Goossen |
| 2011/0301784 A1 | 12/2011 | Oakley et al. |
| 2011/0311099 A1 | 12/2011 | Derbanne |
| 2012/0015686 A1 | 1/2012 | Krupnik |
| 2012/0019660 A1 | 1/2012 | Golan et al. |
| 2012/0029731 A1 | 2/2012 | Waldock et al. |
| 2012/0049035 A1 | 3/2012 | Black et al. |
| 2012/0050524 A1 | 3/2012 | Rinner et al. |
| 2012/0083945 A1 | 4/2012 | Oakley et al. |
| 2012/0089937 A1 | 4/2012 | Hsieh et al. |
| 2012/0105634 A1 | 5/2012 | Meidan et al. |
| 2012/0113514 A1 | 5/2012 | Rodman |
| 2012/0200703 A1 | 8/2012 | Nadir et al. |
| 2012/0200722 A1 | 8/2012 | Kozlov et al. |
| 2012/0276844 A1 | 11/2012 | Goossen et al. |
| 2012/0287274 A1 | 11/2012 | Bevirt |
| 2012/0287284 A1 | 11/2012 | Jacobsen et al. |
| 2012/0307042 A1 | 12/2012 | Lee et al. |
| 2012/0313557 A1 | 12/2012 | Pettey et al. |
| 2012/0316685 A1* | 12/2012 | Pettersson ................ F16F 3/00 700/275 |
| 2013/0026689 A1 | 1/2013 | Bloomfield et al. |
| 2013/0051778 A1 | 2/2013 | Dimotakis |
| 2013/0109272 A1 | 5/2013 | Rindlisbacher |
| 2013/0138270 A1 | 5/2013 | Christensen et al. |
| 2013/0148295 A1 | 6/2013 | Minn et al. |
| 2013/0162822 A1 | 6/2013 | Lee et al. |
| 2013/0173088 A1 | 7/2013 | Callou et al. |
| 2013/0176423 A1 | 7/2013 | Rischmuller et al. |
| 2013/0271618 A1 | 10/2013 | Koryakovskiy et al. |
| 2013/0286233 A1 | 10/2013 | Kozlov et al. |
| 2013/0293362 A1 | 11/2013 | Parazynski |
| 2013/0321656 A1 | 12/2013 | Ducharme et al. |
| 2014/0008496 A1 | 1/2014 | Ye et al. |
| 2014/0037278 A1 | 2/2014 | Wang |
| 2014/0057678 A1 | 2/2014 | Krupnik |
| 2014/0267778 A1 | 9/2014 | Webb et al. |
| 2014/0267805 A1 | 9/2014 | Webb |
| 2014/0267810 A1 | 9/2014 | Webb et al. |
| 2014/0270743 A1 | 9/2014 | Webb et al. |
| 2014/0270744 A1 | 9/2014 | Webb et al. |
| 2014/0371954 A1 | 12/2014 | Lee et al. |
| 2015/0097950 A1 | 4/2015 | Wang et al. |
| 2015/0142211 A1 | 5/2015 | Shehata et al. |
| 2015/0142213 A1 | 5/2015 | Wang et al. |
| 2015/0156385 A1 | 6/2015 | Wang |
| 2015/0202540 A1 | 7/2015 | Erhart et al. |
| 2015/0241713 A1 | 8/2015 | Laroia et al. |
| 2015/0268666 A1 | 9/2015 | Wang et al. |
| 2016/0012719 A1 | 1/2016 | Krupnik |
| 2016/0028956 A1 | 1/2016 | Webb et al. |
| 2016/0119546 A1 | 4/2016 | Wang et al. |
| 2016/0159463 A1 | 6/2016 | Wang et al. |
| 2016/0195939 A1 | 7/2016 | Parazynski |
| 2017/0171468 A1 | 6/2017 | Wang et al. |
| 2017/0223247 A1 | 8/2017 | Wang |

FOREIGN PATENT DOCUMENTS

| | | |
|---|---|---|
| CN | 1900811 A | 1/2007 |
| CN | 1924736 A | 3/2007 |
| CN | 101012906 A | 8/2007 |
| CN | 101093733 A | 12/2007 |
| CN | 201002722 Y | 1/2008 |
| CN | 201041611 Y | 3/2008 |

(56) References Cited

FOREIGN PATENT DOCUMENTS

| | | |
|---|---|---|
| CN | 101173826 A | 5/2008 |
| CN | 201060679 Y | 5/2008 |
| CN | 101232841 A | 7/2008 |
| CN | 201163331 Y | 12/2008 |
| CN | 101403848 A | 4/2009 |
| CN | 201273910 Y | 7/2009 |
| CN | 201287830 Y | 8/2009 |
| CN | 201380965 Y | 1/2010 |
| CN | 100590748 C | 2/2010 |
| CN | 101685235 A | 3/2010 |
| CN | 101734377 A | 6/2010 |
| CN | 101811578 A | 8/2010 |
| CN | 101817182 A | 9/2010 |
| CN | 101872198 A | 10/2010 |
| CN | 201604796 U | 10/2010 |
| CN | 201604802 U | 10/2010 |
| CN | 201626554 U | 11/2010 |
| CN | 102043410 A | 5/2011 |
| CN | 102095060 A | 6/2011 |
| CN | 102099737 A | 6/2011 |
| CN | 102266672 A | 12/2011 |
| CN | 102348068 A | 2/2012 |
| CN | 101872198 B | 5/2012 |
| CN | 102436118 A | 5/2012 |
| CN | 102556359 A | 7/2012 |
| CN | 202392373 U | 8/2012 |
| CN | 202392374 U | 8/2012 |
| CN | 102707734 A | 10/2012 |
| CN | 102774505 A | 11/2012 |
| CN | 102879603 A | 1/2013 |
| CN | 102999049 A | 3/2013 |
| CN | 103049007 A | 4/2013 |
| CN | 103394199 A | 11/2013 |
| CN | 103426282 A | 12/2013 |
| DE | 10208413 A1 | 9/2003 |
| DE | 102008039468 A1 | 3/2010 |
| EP | 1227671 A1 | 7/2002 |
| EP | 1912015 A2 | 4/2008 |
| EP | 2341387 A | 9/2011 |
| EP | 2356806 B1 | 5/2012 |
| FR | 2656730 A1 | 7/1991 |
| FR | 2730570 A1 | 8/1996 |
| GB | 2375173 A | 11/2002 |
| GB | 2464147 A | 4/2010 |
| JP | S6288898 A | 4/1987 |
| JP | H02186197 A | 7/1990 |
| JP | H06078182 A | 3/1994 |
| JP | 2000077150 A | 3/2000 |
| JP | 2001092001 A | 4/2001 |
| JP | 2001209426 A | 8/2001 |
| JP | 2001235793 A | 8/2001 |
| JP | 2002344784 A | 11/2002 |
| JP | 2003018452 A | 1/2003 |
| JP | 2004112553 A | 4/2004 |
| JP | 2004219208 A | 8/2004 |
| JP | 2004242128 A | 8/2004 |
| JP | 3104505 U | 9/2004 |
| JP | 2005150781 A | 6/2005 |
| JP | 2005234230 A | 9/2005 |
| JP | 2005269413 A | 9/2005 |
| JP | 2005315709 A | 11/2005 |
| JP | 2006020261 A | 1/2006 |
| JP | 2006264573 A | 10/2006 |
| JP | 2006281830 A | 10/2006 |
| JP | 2007096493 A | 4/2007 |
| JP | 2007183356 A | 7/2007 |
| JP | 2008022120 A | 1/2008 |
| JP | 2008167257 A | 7/2008 |
| JP | 2008197388 A | 8/2008 |
| JP | 2008232944 A | 10/2008 |
| JP | 2009023379 A | 2/2009 |
| JP | 2010039350 A | 2/2010 |
| JP | 2010078842 A | 4/2010 |
| JP | 2010098575 A | 4/2010 |
| JP | 2010288236 A | 12/2010 |
| JP | 2011151790 A | 8/2011 |
| JP | 2011189929 A | 9/2011 |
| KR | 20100035097 A | 4/2010 |
| KR | 101042200 B1 | 6/2011 |
| KR | 20120105201 A | 9/2012 |
| RU | 2369535 C1 | 10/2009 |
| TW | 201015108 A | 4/2010 |
| TW | 201344239 A | 11/2013 |
| WO | 9918385 A1 | 4/1999 |
| WO | WO-2004067432 A2 | 8/2004 |
| WO | WO-2007033033 A2 | 3/2007 |
| WO | WO-2008099642 A1 | 8/2008 |
| WO | WO-2008116982 A2 | 10/2008 |
| WO | WO-2009109711 A2 | 9/2009 |
| WO | WO-2009109711 A3 | 11/2009 |
| WO | WO-2010031486 A1 | 3/2010 |
| WO | WO-2010063916 A1 | 6/2010 |
| WO | WO-2012001677 A2 | 1/2012 |

OTHER PUBLICATIONS

The United States Patent Office (USPTO) Non Final Office Action and Notice of References Cited for U.S. Appl. No. 14/537,610 dated Aug. 17, 2017 13 Pages.

The United States Patent Office (USPTO) Final Office Action and Notice of References Cited for U.S. Appl. No. 14/670,107 dated Aug. 11, 2017 32 Pages.

As Filed U.S. Appl. No. 14/977,406, filed Dec. 21, 2015 108 Pages.

As Filed U.S. Appl. No. 14/984,348, filed Dec. 30, 2015 73 Pages.

Miller, et al. Gimbal system configurations and line-of-sight control techniques for small UAV applications. Proceedings of SPIE airborne intelligence, surveillance, reconnaissance systems and applications X 8713 (2013): 871308-1.

Notice of allowance dated Mar. 9, 2017 for U.S. Appl. No. 14/564,016.

Co-pending U.S. Appl. No. 15/280,516, filed Sep. 29, 2016.

Co-pending U.S. Appl. No. 15/487,172, filed Apr. 13, 2017.

Gutierrez, et al., A Native iPhone Packbot OCU, In Proc. HRI '09, Mar. 11-13, 2009, La Jolla, California, USA, 1 page.

Office action dated Apr. 5, 2017 for U.S. Appl. No. 14/670,107.

Office action dated Jun. 6, 2017 for U.S. Appl. No. 15/487,172.

Picchi, Native iOS Environment Development, Pro iOS Design and Development, 2011, pp. 319-346.

U.S. Appl. No. 14/537,610, filed Nov. 10, 2014.

U.S. Appl. No. 14/670,107, filed Mar. 26, 2015.

European Patent Office (EPO) Communication for 11872105.9 dated Jun. 12, 2017 16 Pages.

European search report and opinion dated Apr. 1, 2016 for EP Application No. 13895168.6.

European search report and opinion dated Apr. 25, 2016 for EP Application No. 14831287.9.

European search report and opinion dated May 15, 2015 for EP Application No. 11871956.6.

European search report and opinion dated May 26, 2015 for EP Application No. 11872105.9.

International search report and written opinion dated May 24, 2012 for PCT Application No. CN2011082462.

International search report and written opinion dated Jun. 14, 2012 for PCT Application No. CN2011/079703.

International search report and written opinion dated Jun. 14, 2012 for PCT Application No. CN2011/079704.

International search report and written opinion dated Jul. 16, 2014 for PCT/CN2013/084857.

International search report dated Mar. 27, 2014 for PCT/CN2013/080721.

International search report dated May 26, 2014 for PCT/CN2014/071938.

Krainev. Machine mechanics. Fundamental Dictionary Moscow. Machinebuilding. 2000. p. 143. (in Russian with English abstract).

Notice of allowance dated Aug. 17, 2016 for U.S. Appl. No. 14/984,348.

Notice of allowance dated Sep. 11, 2014 for U.S. Appl. No. 14/179,078.

(56) References Cited

OTHER PUBLICATIONS

Notice of allowance dated Oct. 16, 2015 for U.S. Appl. No. 14/134,375.
Notice of allowance dated Nov. 20, 2014 for U.S. Appl. No. 14/045,606.
Office action dated Feb. 22, 2016 for U.S. Appl. No. 14/564,016.
Office action dated Mar. 12, 2015 for U.S. Appl. No. 14/564,016.
Office action dated Mar. 24, 2016 for U.S. Appl. No. 14/984,348.
Office action dated Apr. 4, 2014 for U.S. Appl. No. 14/134,375.
Office action dated Apr. 8, 2014 for U.S. Appl. No. 14/179,078.
Office action dated Apr. 10, 2014 for U.S. Appl. No. 14/045,606.
Office action dated Apr. 21, 2016 for U.S. Appl. No. 14/977,406.
Office action dated May 20, 2015 for U.S. Appl. No. 14/134,375.
Office action dated May 27, 2015 for U.S. Appl. No. 14/564,016.
Office action dated Jun. 16, 2016 for U.S. Appl. No. 14/564,016.
Office action dated Jul. 17, 2014 for U.S. Appl. No. 14/134,375.
Office action dated Sep. 4, 2015 for U.S. Appl. No. 14/564,016.
Office action dated Nov. 21, 2016 for U.S. Appl. No. 14/564,016.
Top Vision Ltd. website; Gallery->>Payloads [retrieved on Oct. 7, 2016] Retrieved from internet<URL:https://web.archive.org/web/20091124084102/http://www.topivision.com/gallery.asp?cat=4> published on Nov. 24, 2009 as per Wayback Machine See top and 6th from top images.
Utility Model Patent Right Evaluation Report dated Aug. 24, 2013 for Patent No. ZL2011204761516 for Gyroscopic Dynamic Self-balancing PTZ.
European Patent Office (EPO) Communication for Application No. 13895168.6 dated Oct. 13, 2017 7 Pages.
As Filed U.S. Appl. No. 14/179,078, filed Feb. 12, 2014 103 Pages.
D. Pitman and M.L. Cummings, Collaborative Exploration with a Micro Aerial Vehicle: A Novel Interaction Method for Controlling a MAV with a Hand-Held Device, Advances in Human-Computer Interaction, vol. 2012, Article 18, Jan. 2012.

* cited by examiner

APPARATUS AND METHODS FOR STABILIZATION AND VIBRATION REDUCTION

CROSS-REFERENCE

This application is a continuation application which claims the benefit of U.S. application Ser. No. 14/984,348, filed Dec. 30, 2015, which is a continuation application of U.S. application Ser. No. 14/134,375, filed on Dec. 19, 2013, now U.S. Pat. No. 9,277,130, which is a continuation application of International Application No. PCT/CN2013/084857, filed on Oct. 8, 2013, the contents of which are hereby incorporated in their entirety.

BACKGROUND OF THE INVENTION

For many years, both amateur and professional photographers and videographers have struggled with blurred images due to instability of the camera mounting, motion by the user, motion and vibration transferred to the camera from a mobile transport, or some combination of these issues.

Currently, there exists primarily four methods of vibration dampening commonly employed in photography and videography to reduce the effects of vibration on the picture: software stabilization, lens stabilization, sensor stabilization, and overall shooting equipment stabilization.

Lens stabilization and sensor stabilization are now widely applied in many consumer digital cameras. The general principle of lens stabilization is to eliminate the shake on the lens by controlling horizontal displacement or rotation of a certain lens or some lenses; and sensor stabilization is intended to offset the vibration by enabling a photosensitive sensor to translate or rotate. Lens stabilization and sensor stabilization are both implemented within the shooting equipment, requiring minimal volume. However, due to structural limitations and limited travel range of the movement (including translation and rotation) of the lens or sensor, vibration with large amplitude or at high frequency is still difficult to eliminate completely, particularly when carrying the shooting equipment or mounting video equipment on a moving vehicle.

The effectiveness of software stabilization is limited. An extremely large amount of computation is required in the shake elimination process for video, often resulting in only a limited beneficial effect.

Overall, methods applied to shooting equipment stabilization mainly perform stabilization for the shooting equipment on three rotation axes, with a large rotation range and reasonably quick response. This can substantially overcome the drawbacks in lens stabilization and sensor stabilization. However, as stabilization is performed for the entire set of (video) equipment, the structure is usually quite large, making it inconvenient to carry or use, and requires very large amounts of energy (batteries) to drive the stabilizing equipment, making it inconvenient, impractical and relatively expensive for most commercial and personal applications.

SUMMARY OF THE INVENTION

The present invention provides an alternative design for performing effective stabilization for a wide variety of applications including but not limited to still photo and video imaging. The present invention, embodies, in part, an apparatus and method of performing stabilization of an imaging device by, e.g., partitioning the optical unit from the non-optical unit of the imaging device. The present invention can substantially reduce the mass volume of the stabilizing device necessary to achieve such stabilization. This disclosed approach of stabilization i) reduces size and/or weight, ii) augments existing stabilization methods and/or, iii) facilitates miniaturization of the entire shooting equipment construct and any external stabilization structures used therewith.

In one aspect, the present invention provides an apparatus for stabilizing an imaging device comprising an optical unit and a non-optical unit, said optical unit and non-optical unit constituting the entire image device, said apparatus comprising: a frame assembly rotatably coupled to the optical unit of the imaging device, without supporting the entire imaging device as a whole, wherein the frame assembly configured to permit the optical unit to rotate about at least a first rotational axis and a second rotational axis, the optical unit comprising at least a lens and a photosensor that is optically coupled to the lens; and a motor assembly coupled to the frame assembly, the motor assembly configured to directly drive the frame assembly so as to permit the optical unit to rotate about at least the first rotational axis or the second rotational axis.

In some embodiments the non-optical unit of the imaging device is not mechanically coupled to the apparatus. In some embodiments the optical unit and the non-optical unit are electrically coupled. In some embodiments the optical unit and the non-optical unit are movable relative to each other.

In some embodiments, the non-optical unit of the imaging device is not mechanically coupled optical unit of the imaging device. In some embodiments, the optical unit and the non-optical unit communicate with each other wirelessly.

In some embodiments the optical unit of the imaging device further comprises at least one of a filter, positional sensor, storage medium, battery, zooming motor, circuitry, power supply, processor, or housing. In still other embodiments, the optical unit of the imaging device further comprises a weight adapted to provide stability for the optical unit. In still other embodiments, the weight comprises a battery.

In some embodiments, the non-optical unit does not include a lens or a photosensor. In other embodiments, the non-optical unit of the imaging device comprises at least one of a positional sensor, storage medium, battery, motors, circuitry, power supply, processor, or housing.

In some embodiments, at least one of the first rotational axis and the second rotational axis corresponds to a pitch, roll or yaw axis of the optical unit. In other embodiments, the frame assembly is further configured to permit the optical unit to rotate about a third rotational axis. In some embodiments, the third rotational axis corresponds to at least one of a pitch, roll, or yaw axis of the optical unit.

Still further, in some embodiments, the apparatus further comprises one or more positional sensors, wherein at least one of the one or more positional sensors is configured to detect state information associated with the optical unit. In addition the apparatus further comprises a controller for generating one or more motor signals based on the state information associated with the optical unit. In some embodiments, the state information comprises translational or rotational movement information or positional information.

In still other embodiments, at least one of the positional sensors is configured to detect state information associated with the non-optical unit.

In still further embodiments, at least one of the one or more positional sensors is configured to measure movement associated with at least a pitch, roll, or yaw axis of the optical unit. In addition, at least one of the one or more positional sensors comprises an inertial sensor.

In any of the preceding embodiments, the apparatus is configured to be coupled to a movable object. In addition, the apparatus is configured to reduce relatively more movement experienced by the optical unit caused by the movable object than the amount of movement experienced by the non-optical unit. In some embodiments, the apparatus for stabilizing an imaging device comprising an optical unit and a non-optical unit is configured to be handheld.

Still further, in any of the preceding embodiments, the frame assembly comprises a first stage connected to and supporting the optical unit, and a second stage movable relative to the first stage and the optical unit about the first rotational axis. In addition, the frame assembly can further comprise a third stage movable relative to the second stage about the second rotational axis.

Provided herein is an apparatus for stabilizing at least a portion of an imaging device that comprises an optical unit and a non-optical unit, said apparatus comprising a frame assembly having a volume that is less than that of a frame assembly required to support the entire imaging device having the optical unit and the non-optical unit, wherein the frame assembly is configured to support the optical unit of the imaging device, wherein the frame assembly is configured to permit rotation of the optical unit about at least a first rotational axis and a second rotational axis, and wherein the optical unit comprises at least a lens and a photosensor that is optically coupled to the lens; and wherein the motor assembly is configured to drive the frame assembly so as to permit rotation of the optical unit about at least the first rotational axis or the second rotational axis.

In some embodiments the non-optical unit of the imaging device is not mechanically coupled to the apparatus. In some embodiments the optical unit and the non-optical unit are electrically coupled. In some embodiments the optical unit and the non-optical unit are movable relative to each other.

In some embodiments, the non-optical unit of the imaging device is not mechanically coupled optical unit of the imaging device. In some embodiments, the optical unit and the non-optical unit communicate with each other wirelessly.

In some embodiments the optical unit of the imaging device further comprises at least one of a filter, positional sensor, storage medium, battery, zooming motor, circuitry, power supply, processor, or housing. In still other embodiments, the optical unit of the imaging device further comprises a weight adapted to provide stability for the optical unit. In still other embodiments, the weight comprises a battery.

In some embodiments, the non-optical unit does not include a lens or a photosensor. In other embodiments, the non-optical unit of the imaging device comprises at least one of a positional sensor, storage medium, battery, motors, circuitry, power supply, processor, or housing.

In some embodiments, at least one of the first rotational axis and the second rotational axis corresponds to a pitch, roll or yaw axis of the optical unit. In other embodiments, the frame assembly is further configured to permit the optical unit to rotate about a third rotational axis. In some embodiments, the third rotational axis corresponds to at least one of a pitch, roll, or yaw axis of the optical unit.

Still further, in some embodiments, the apparatus further comprises one or more positional sensors, wherein at least one of the one or more positional sensors is configured to detect state information associated with the optical unit. In addition the apparatus further comprises a controller for generating one or more motor signals based on the state information associated with the optical unit. In some embodiments, the state information comprises translational or rotational movement information or positional information.

In still other embodiments, at least one of the positional sensors is configured to detect state information associated with the non-optical unit.

In still further embodiments, at least one of the one or more positional sensors is configured to measure movement associated with at least a pitch, roll, or yaw axis of the optical unit. In addition, at least one of the one or more positional sensors comprises an inertial sensor.

In any of the preceding embodiments, the apparatus is configured to be coupled to a movable object. In addition, the apparatus is configured to reduce relatively more movement experienced by the optical unit caused by the movable object than the amount of movement experienced by the non-optical unit. In some embodiments, the apparatus for stabilizing at least a portion of an imaging device comprising an optical unit and a non-optical unit is configured to be handheld.

Still further, in any of the preceding embodiments, the frame assembly comprises a first stage connected to and supporting the optical unit, and a second stage movable relative to the first stage and the optical unit about the first rotational axis. In addition, the frame assembly can further comprise a third stage movable relative to the second stage about the second rotational axis.

In another aspect, the present invention provides an apparatus for stabilizing at least a portion of an imaging device that comprises an optical unit and a non-optical unit, said optical unit and non-optical unit constituting the entire image device, said apparatus comprising: a frame assembly supporting the optical unit of the imaging device, wherein the frame assembly is configured to permit rotation of the optical unit about at least a first rotational axis and a second rotational axis, and wherein the optical unit comprises at least a lens and a photosensor that is optically coupled to the lens; and a motor assembly operably connected to the frame assembly, wherein the motor assembly is configured to drive the frame assembly so as to permit rotation of the optical unit about at least the first rotational axis or the second rotational axis, and wherein the motor assembly consumes a minimum amount of energy that is less than that required to drive a frame assembly supporting the entire imaging device.

In some embodiments the non-optical unit of the imaging device is not mechanically coupled to the apparatus. In some embodiments the optical unit and the non-optical unit are electrically coupled. In some embodiments the optical unit and the non-optical unit are movable relative to each other.

In some embodiments, the non-optical unit of the imaging device is not mechanically coupled optical unit of the imaging device. In some embodiments, the optical unit and the non-optical unit communicate with each other wirelessly.

In some embodiments the optical unit of the imaging device further comprises at least one of a filter, positional sensor, storage medium, battery, zooming motor, circuitry, power supply, processor, or housing. In still other embodiments, the optical unit of the imaging device further comprises a weight adapted to provide stability for the optical unit. In still other embodiments, the weight comprises a battery.

In some embodiments, the non-optical unit does not include a lens or a photosensor. In other embodiments, the non-optical unit of the imaging device comprises at least one of a positional sensor, storage medium, battery, motors, circuitry, power supply, processor, or housing.

In some embodiments, at least one of the first rotational axis and the second rotational axis corresponds to a pitch, roll or yaw axis of the optical unit. In other embodiments, the frame assembly is further configured to permit the optical unit to rotate about a third rotational axis. In some embodiments, the third rotational axis corresponds to at least one of a pitch, roll, or yaw axis of the optical unit.

Still further, in some embodiments, the apparatus further comprises one or more positional sensors, wherein at least one of the one or more positional sensors is configured to detect state information associated with the optical unit. In addition the apparatus further comprises a controller for generating one or more motor signals based on the state information associated with the optical unit. In some embodiments, the state information comprises translational or rotational movement information or positional information.

In still other embodiments, at least one of the positional sensors is configured to detect state information associated with the non-optical unit.

In still further embodiments, at least one of the one or more positional sensors is configured to measure movement associated with at least a pitch, roll, or yaw axis of the optical unit. In addition, at least one of the one or more positional sensors comprises an inertial sensor.

In some of the preceding embodiments, the apparatus is configured to be coupled to a movable object. In addition, the apparatus is configured to reduce relatively more movement experienced by the optical unit caused by the movable object than the amount of movement experienced by the non-optical unit. In some embodiments, the apparatus for stabilizing at least a portion of an imaging device comprising an optical unit and a non-optical unit is configured to be handheld.

Still further, in some of the preceding embodiments, the frame assembly comprises a first stage connected to and supporting the optical unit, and a second stage movable relative to the first stage and the optical unit about the first rotational axis. In addition, the frame assembly can further comprise a third stage movable relative to the second stage about the second rotational axis.

In some embodiments of the apparatus, said energy is less than the amount of energy required to drive the frame assembly when the entire imaging device apparatus as a whole is supported by the frame assembly.

In some embodiments wherein an apparatus for stabilizing at least a portion of an imaging device that comprises an optical unit and a non-optical unit, and wherein the motor assembly consumes a minimum amount of energy that is less than that required to drive a frame assembly supporting the entire imaging device, said energy is less than the amount of energy required to drive the frame assembly when the entire imaging device apparatus as a whole is supported by the frame assembly.

In yet another aspect, the present invention provides an imaging device comprising an optical unit which comprises at least a lens and a photosensor that is optically coupled to the lens; and a non-optical unit that is electrically coupled to the optical unit, wherein the optical unit is movable relative to the non-optical unit via actuation of a frame assembly coupled to said optical unit.

In some embodiments, the non-optical unit is not mechanically coupled to the frame assembly.

In some embodiments, the optical unit further comprises at least one of a filter, positional sensor, storage medium, battery, zooming motor, circuitry, power supply, processor, or housing. In other embodiments, the optical unit further comprises a weight adapted to provide stability for the optical unit. In some embodiments the weight comprises a battery.

In some embodiments, the non-optical unit does not include a lens or a photosensor. In other embodiments, the non-optical unit of the imaging device comprises at least one of a positional sensor, storage medium, battery, motors, circuitry, power supply, processor, or housing.

In some embodiments of the imaging device, the optical unit is movable about a first rotational axis and a second rotational axis via the actuation of the frame assembly and the optical unit is movable about a third rotational axis via the actuation of the frame assembly.

In other embodiments of the imaging device, the optical unit is movable about a third rotational axis via the actuation of the frame assembly and the third rotational axis corresponds to at least one of a pitch, roll, or yaw axis of the optical unit.

In still further embodiments of the imaging device, the state information associated with the optical unit is detectable by one or more positional sensors and said state information associated with the optical unit is used to generate one or more motor signals that drive the actuation of the frame assembly. Said state information comprises translational or rotational movement information or positional information. In addition, state information associated with the non-optical unit is detectable by one or more positional sensors.

In still further embodiments of the imaging device, at least one of the one or more positional sensors is configured to measure movement associated with at least a pitch, roll, or yaw axis of the optical unit, and at least one of the one or more positional sensors comprises an inertial sensor.

In some embodiments, the frame assembly of the imaging device is configured to be coupled to a movable object.

In some embodiments of the imaging device, the optical unit and the non-optical unit are contained within a single housing. In other embodiments, the optical unit and the non-optical unit are not contained within a single housing.

In still other embodiments of the imaging device, the optical unit and the non-optical unit are both utilized to capture and store an image.

Provided herein is an aerial vehicle comprising a vehicle body, and attached thereto, an apparatus disclosed herein for stabilizing at least a portion of an imaging device. The apparatus attached to the vehicle comprises a frame assembly rotatably coupled to an optical unit of the imaging device, without supporting the entire imaging device as a whole, wherein the frame assembly is configured to permit the optical unit to rotate about at least a first rotational axis and a second rotational axis. Where desired, the optical unit comprises at least a lens and a photosensor that is optically coupled to the lens. The apparatus typically comprises a motor assembly coupled to the frame assembly, wherein the motor assembly is configured to directly drive the frame assembly so as to permit the optical unit to rotate about at least the first rotational axis or the second rotational axis.

In a separate aspect, the present invention provides an aerial vehicle comprising a vehicle body, and attached thereto, an apparatus disclosed herein for stabilizing at least a portion of an imaging device. The apparatus attached to the vehicle comprises a frame assembly having a volume that is less than that of a frame assembly required to support the entire imagining device with the optical and non-optical units, wherein the frame assembly is configured to permit the optical unit to rotate about at least a first rotational axis and a second rotational axis. Where desired, the optical unit comprises at least a lens and a photosensor that is optically coupled to the lens. The apparatus typically comprises a motor assembly coupled to the frame assembly, wherein the motor assembly is configured to directly or indirectly drive the frame assembly so as to permit the optical unit to rotate about at least the first rotational axis or the second rotational axis.

In still yet another embodiment, the present invention provides an aerial vehicle comprising a vehicle body, and attached thereto, an apparatus disclosed herein for stabilizing at least a portion of an imaging device. The apparatus attached to the vehicle comprises a frame assembly supporting the optical unit of the imaging device, wherein the frame assembly is configured to permit rotation of the optical unit about at least a first rotational axis and a second rotational axis, and wherein the optical unit comprises at least a lens and a photosensor that is optically coupled to the lens. The apparatus typically comprises a motor assembly operably connected to the frame assembly, wherein the motor assembly is configured to drive the frame assembly so as to permit rotation of the optical unit about at least the first rotational axis or the second rotational axis, and wherein the motor assembly consumes a minimum amount of energy that is less than that required to drive a frame assembly supporting the entire imaging device.

In some embodiments of the aerial vehicle, said vehicle comprises an engine configured to drive movement of said aerial vehicle. In some embodiments, the engine is configured within said vehicle body.

In some embodiments, the aerial vehicle comprises one or more blades configured to rotate to provide lift to the unmanned aerial vehicle.

In some embodiments, the aerial vehicle is an unmanned aerial vehicle capable of controlled flight without requiring an occupant of the aerial vehicle.

In some embodiments of the aerial vehicle, the non-optical unit is supported by the vehicle body without being supported by the frame assembly.

Provided herein is a method of stabilizing at least a portion of an imaging device that comprises an optical unit and a non-optical unit, said method comprising: (1) supporting the optical unit of the imaging device using a frame assembly without supporting the entire imaging device as a whole, wherein the frame assembly is configured to permit rotation of the optical unit about at least a first rotational axis and a second rotational axis, and wherein the optical unit comprises at least a lens and a photosensor that is optically coupled to the lens; and (2) driving the frame assembly using a motor assembly operably connected to the frame assembly, thereby causing rotation of the optical unit about at least the first rotational axis or the second rotational axis.

In some embodiments of the stabilizing method, the optical unit and the non-optical unit are electrically coupled to each other.

In some embodiments of the stabilizing method, the optical unit further comprises at least one of a filter, positional sensor, storage medium, battery, zooming motor, circuitry, power supply, processor, or housing. In other embodiments of the method, the optical unit further comprises a weight adapted to provide stability for the optical unit. In some embodiments, the weight comprises a battery. In still further embodiments, the battery is configured to provide power necessary for operation of an aerial vehicle or the imaging device.

In some embodiments of the stabilizing method, the non-optical unit does not include a lens or a photosensor. In other embodiments of the stabilizing method, the non-optical unit comprises at least one of a positional sensor, storage medium, power supply, battery, motors, circuitry, display, processor, or housing.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit and non-optical unit.

Provided herein is a method of stabilizing at least a portion of an imaging device that comprises an optical unit and a non-optical unit, said optical unit and non-optical unit constituting the entire imaging device, said method comprising: supporting the optical unit of the imaging device using a frame assembly, the frame assembly having a volume that is less than that of a frame assembly required to support the entire imaging device having the optical unit and the non-optical unit, wherein the frame assembly is configured to permit rotation of the optical unit about at least a first rotational axis and a second rotational axis, and wherein the optical unit comprises at least a lens and a photosensor that is optically coupled to the lens; and driving the frame assembly using a motor assembly operably connected to the frame assembly, thereby causing rotation of the optical unit about at least the first rotational axis or the second rotational axis.

In some embodiments of the stabilizing method, the optical unit and the non-optical unit are electrically coupled to each other.

In some embodiments of the stabilizing method, the optical unit further comprises at least one of a filter, positional sensor, storage medium, battery, zooming motor, circuitry, power supply, processor, or housing. In other embodiments of the method, the optical unit further comprises a weight adapted to provide stability for the optical unit. In some embodiments, the weight comprises a battery. In still further embodiments, the battery is configured to provide power necessary for operation of an aerial vehicle or the imaging device.

In some embodiments of the stabilizing method, the non-optical unit does not include a lens or a photosensor. In other embodiments of the stabilizing method, the non-optical unit comprises at least one of a positional sensor, storage medium, power supply, battery, motors, circuitry, display, processor, or housing.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit and non-optical unit.

Provided herein is a method of stabilizing at least a portion of an imaging device that comprises an optical unit and a non-optical unit, said method comprising: supporting the optical unit of the imaging device using a frame assembly, wherein the frame assembly is configured to permit rotation of the optical unit about at least a first rotational axis and a second rotational axis, and wherein the optical unit comprises at least a lens and a photosensor that is optically coupled to the lens; and driving the frame assembly using a motor assembly operably connected to the frame assembly, the motor assembly consuming a minimum amount of energy that is less than that required to drive a frame assembly supporting the entire imaging device, thereby causing rotation of the optical unit about at least the first rotational axis or the second rotational axis.

In some embodiments of the stabilizing method, the optical unit and the non-optical unit are electrically coupled to each other.

In some embodiments of the stabilizing method, the optical unit further comprises at least one of a filter, positional sensor, storage medium, battery, zooming motor, circuitry, power supply, processor, or housing. In other embodiments of the method, the optical unit further comprises a weight adapted to provide stability for the optical unit. In some embodiments, the weight comprises a battery. In still further embodiments, the battery is configured to provide power necessary for operation of an aerial vehicle or the imaging device.

In some embodiments of the stabilizing method, the non-optical unit does not include a lens or a photosensor. In other embodiments of the stabilizing method, the non-optical unit comprises at least one of a positional sensor, storage medium, power supply, battery, motors, circuitry, display, processor, or housing.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit and non-optical unit.

Provided herein is a method of stabilizing at least a portion of an imaging device, said method comprising providing an optical unit comprising at least a lens and a photosensor that is optically coupled to the lens; electrically coupling a non-optical unit to the optical unit; and moving the optical unit relative to the non-optical unit via actuation of a frame assembly coupled to said optical unit.

In some embodiments of the stabilizing method, the optical unit further comprises at least one of a filter, positional sensor, storage medium, battery, zooming motor, circuitry, power supply, processor, or housing. In other embodiments of the method, the optical unit further comprises a weight adapted to provide stability for the optical unit. In some embodiments, the weight comprises a battery. In still further embodiments, the battery is configured to provide power necessary for operation of an aerial vehicle or the imaging device.

In some embodiments of the stabilizing method, the non-optical unit does not include a lens or a photosensor. In other embodiments of the stabilizing method, the non-optical unit comprises at least one of a positional sensor, storage medium, power supply, battery, motors, circuitry, display, processor, or housing.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit and non-optical unit.

Provided herein is an aerial vehicle comprising a vehicle body and a frame assembly connected to said vehicle body, wherein said frame assembly comprises a battery attached thereto and said frame assembly is configured to hold and stabilize an imaging device having an optical unit, and wherein the battery is attached to the assembly at a location separate from that of the imaging device, and wherein the battery is configured to provide power for operation of the aerial vehicle or the imaging device.

In some embodiments, the battery is configured to provide power for operation of the aerial vehicle. In some embodiments the battery has a weight that provides stability to said optical unit of said imaging device.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Apparatus and methods have been developed to reduce the effects of vibration and allow for the size reduction of stabilization equipment for photography and videography, by separating the components of the imaging device, reducing the relative mass of all components involved, and focusing the majority of the stabilization efforts near the optics components of the imaging device.

The apparatus incorporates the use of positional sensors wherein a positional sensor shall mean: motion sensors (accelerometers) and rotation sensors (gyroscopes) or other inertial sensors to continuously calculate via dead reckoning the position, orientation, and velocity (direction and speed of movement) of a moving object without the need for external references"; e.g.: "state information". Positional sensors shall also include sensors that use external references such as compasses, and GPS (global positioning system) sensors, and the like.

In addition, the apparatus incorporates controllers for generating one or more motor signals for driving the movement of the frame assembly of the apparatus, based on the state information generated by the sensors.

An apparatus for stabilizing at least a portion of an imaging device has been developed. The imaging device comprises an optical unit and a non-optical unit. The apparatus comprises a frame assembly rotatably coupled to the optical unit of the imaging device, wherein said frame is configured to permit the optical unit to rotate about at least a first rotational axis and a second rotational axis, the optical unit comprising at least a lens and a photosensor. Said apparatus comprising a frame assembly having a volume that is less than that of a frame assembly required to support the entire imaging device having the optical unit and the non-optical unit. In one embodiment, said frame assembly will have a volume that is no more than one half of that of a frame assembly required to support the entire imaging device. Said apparatus also having a motor assembly wherein the motor assembly consumes a minimum amount of energy that is less than that required to drive a frame assembly supporting the entire imaging device. In a preferred embodiment, said motor assembly will consume no more than one half of the amount of energy than that of a motor assembly required to drive a frame assembly supporting the entire imaging device. Said apparatus can be configured to be coupled to a moving vehicle, an aerial vehicle, or can be handheld.

Figure 1A:
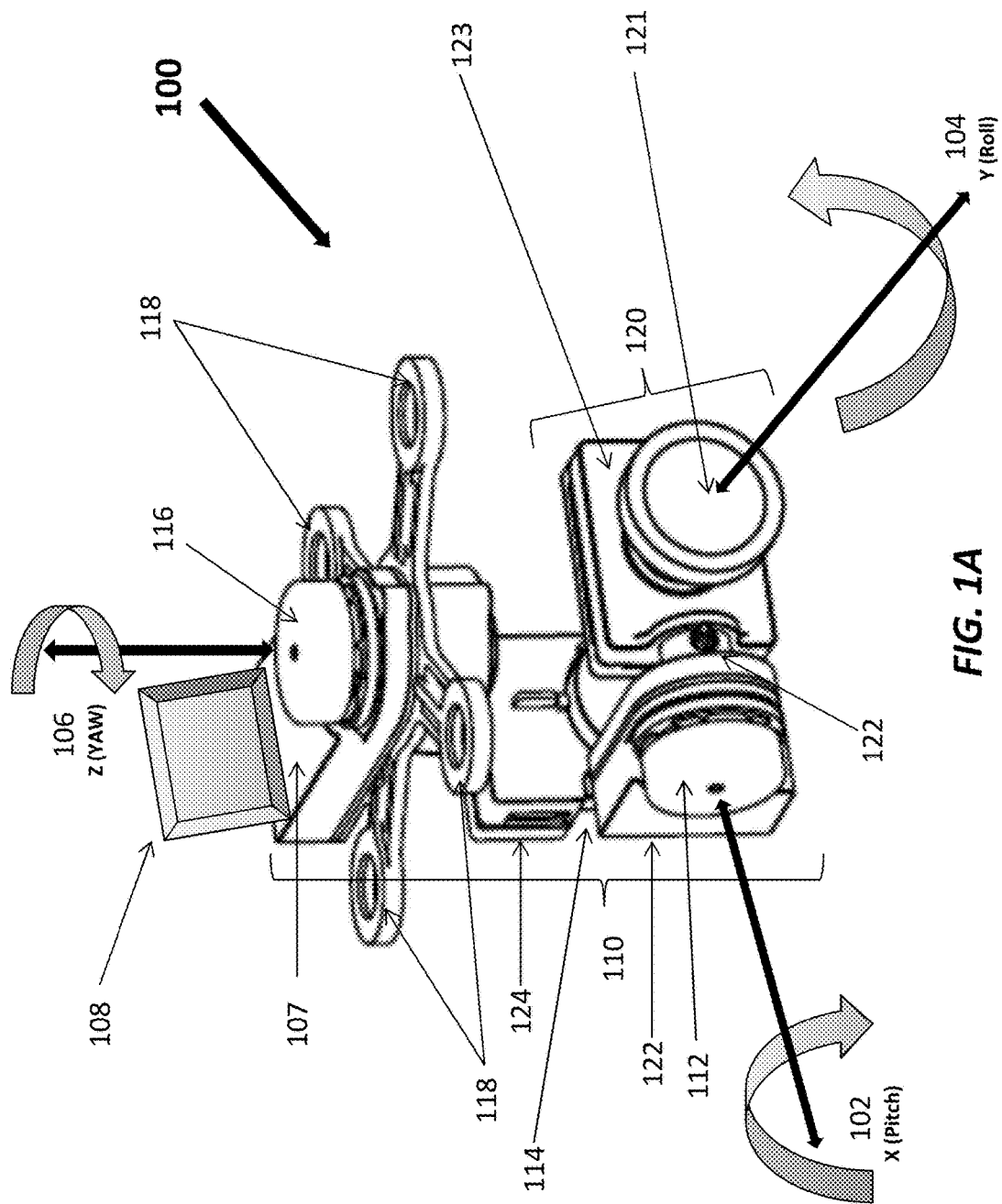
FIG. 1A is an illustrative isometric view of an exemplary stabilizing apparatus assembly.

Provided herein, as shown in FIG. 1A, is an exemplary apparatus 100 for stabilizing an imaging device 115, (108+120) comprising an optical unit 120 and a non-optical unit 108, said apparatus comprising: a frame assembly 110 rotatably coupled to the optical unit 120 of the imaging device, without supporting the entire imaging device as a whole 115, wherein the frame assembly 110 configured to permit the optical unit 120 to rotate about at least a first rotational axis 102 and a second rotational axis 104, the optical unit 120 comprising at least a lens 121 and a photosensor 123 that is optically coupled to the lens; and a motor assembly 112, 114 coupled to the frame assembly 110, the motor assembly configured to directly drive the frame assembly so as to permit the optical unit to rotate about at least the first rotational axis 102 or the second rotational axis 104. As shown, the non-optical unit is coupled to the frame assembly on a base 107, which can be on a completely different part of the frame, or even a remote location.

Figure 1B:
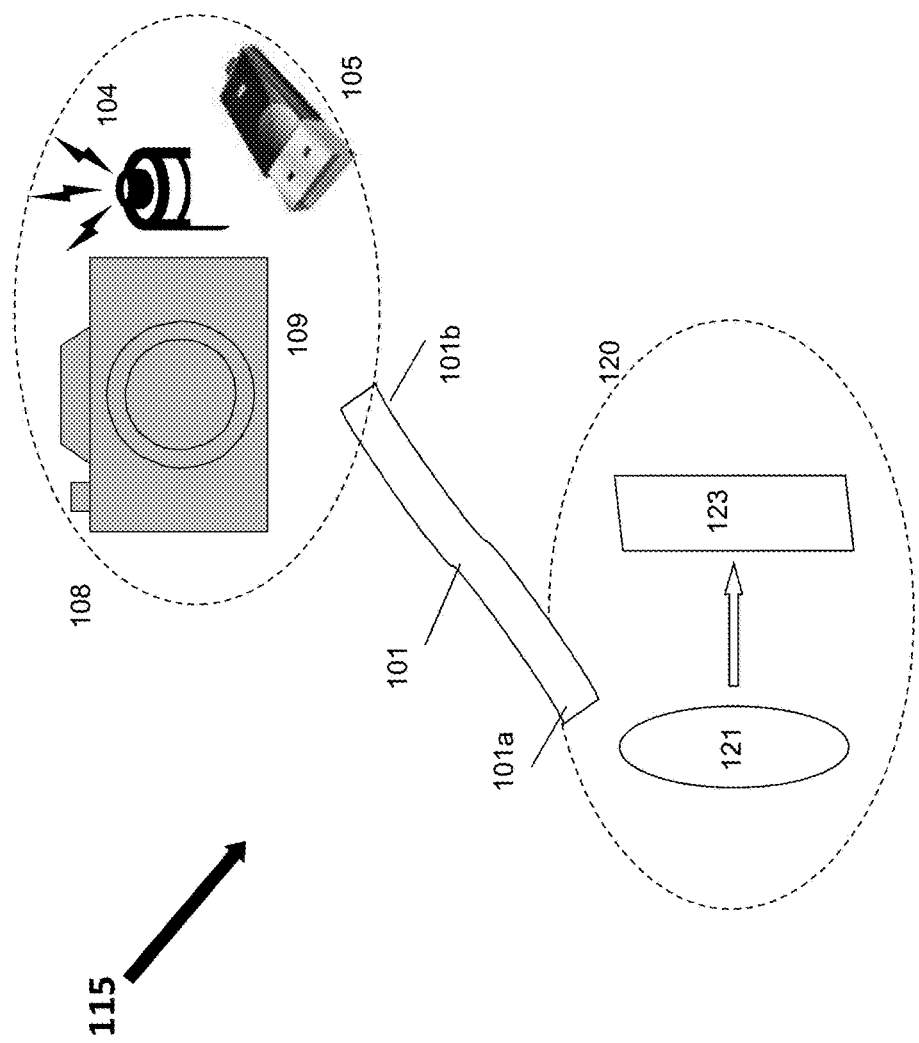
FIGS. 1B-1E are illustrative arrangements of optical and non-optical assemblies of imaging devices.

.As a further illustration, FIG. 1B illustrates one possible configuration of an imaging device 115, wherein the optical unit 120 and the non-optical unit 108 are physically separated, but coupled by optical cabling 101 or wiring, and electrically coupled at each end 101*a*, and 101*b*. In this illustration, the non-optical unit is comprises a housing 109, a battery 104 and storage media 105. The optical unit 120 comprises a lens 121, and a photosensor 123.

In some embodiments the non-optical unit 108 of the imaging device is not mechanically coupled to the apparatus. It is understandable that once one realizes that the components of the imaging device can be physically separated, it is no longer necessary for both components to be physically located on the same apparatus. For example, the optical unit 120 may be located on the apparatus, while the non-optical unit 120 is located somewhere else, preferably nearby, but not necessarily. In some embodiments the optical unit and the non-optical unit are electrically coupled (FIG. 1B). This may typically be accomplished by optical cabling or electrical wiring 101. In some embodiments the optical unit and the non-optical unit are movable relative to each other. As shown in FIG. 1 and further illustrated in FIG. 1B, when the optical unit and non-optical unit are physically separated, and physically located on separate mounting bases, and/or separate axes of a multi-axis apparatus, such as described herein, the optical unit and non-optical unit can be configured to each other, by design.

Figure 1C:
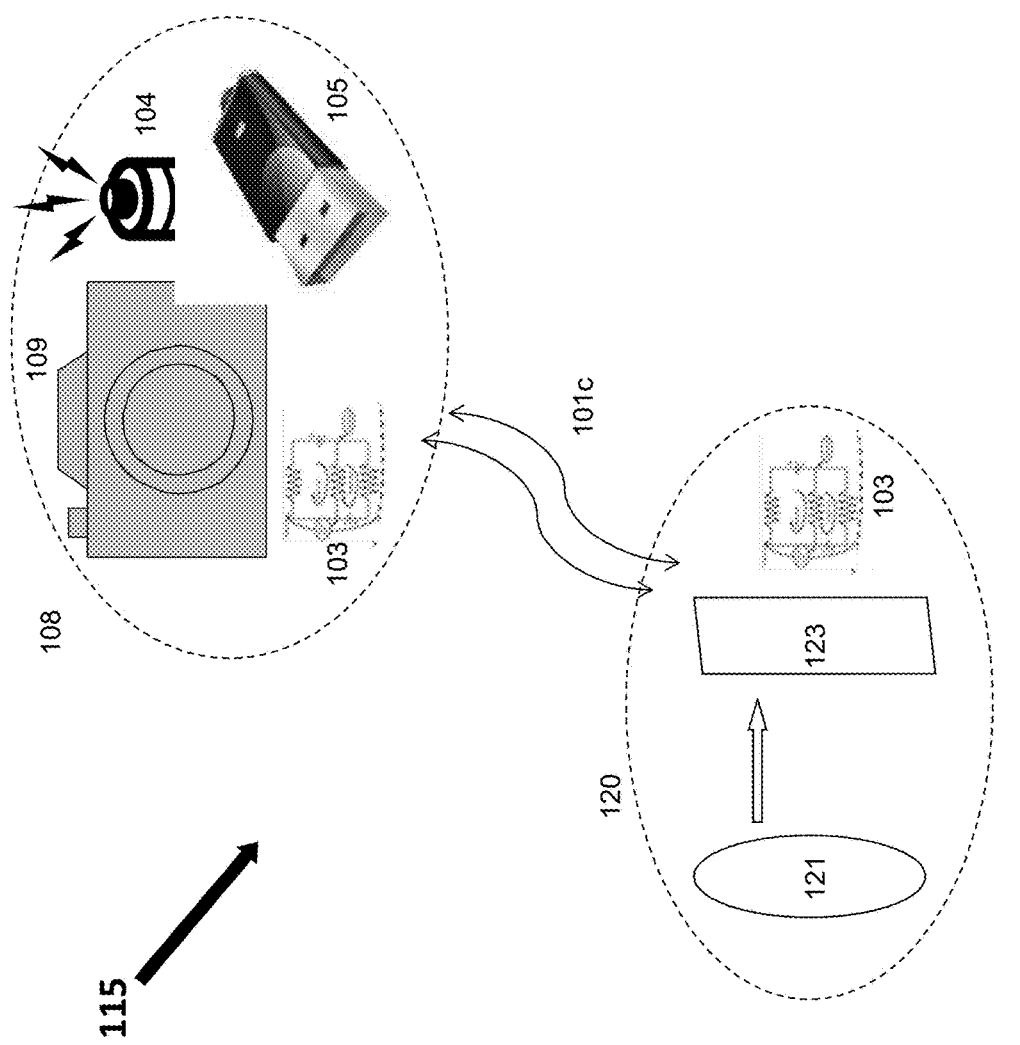
Figure 1D:
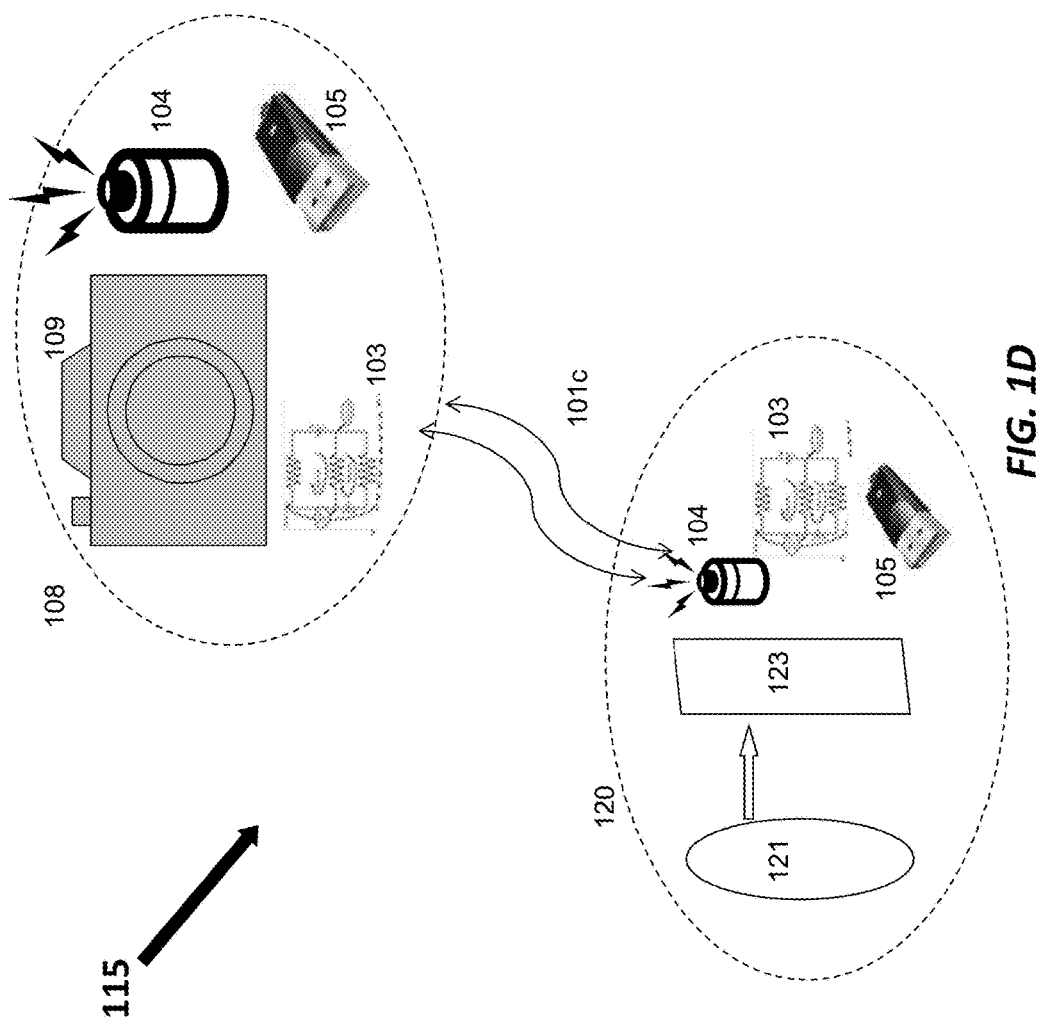
Figure 1E:
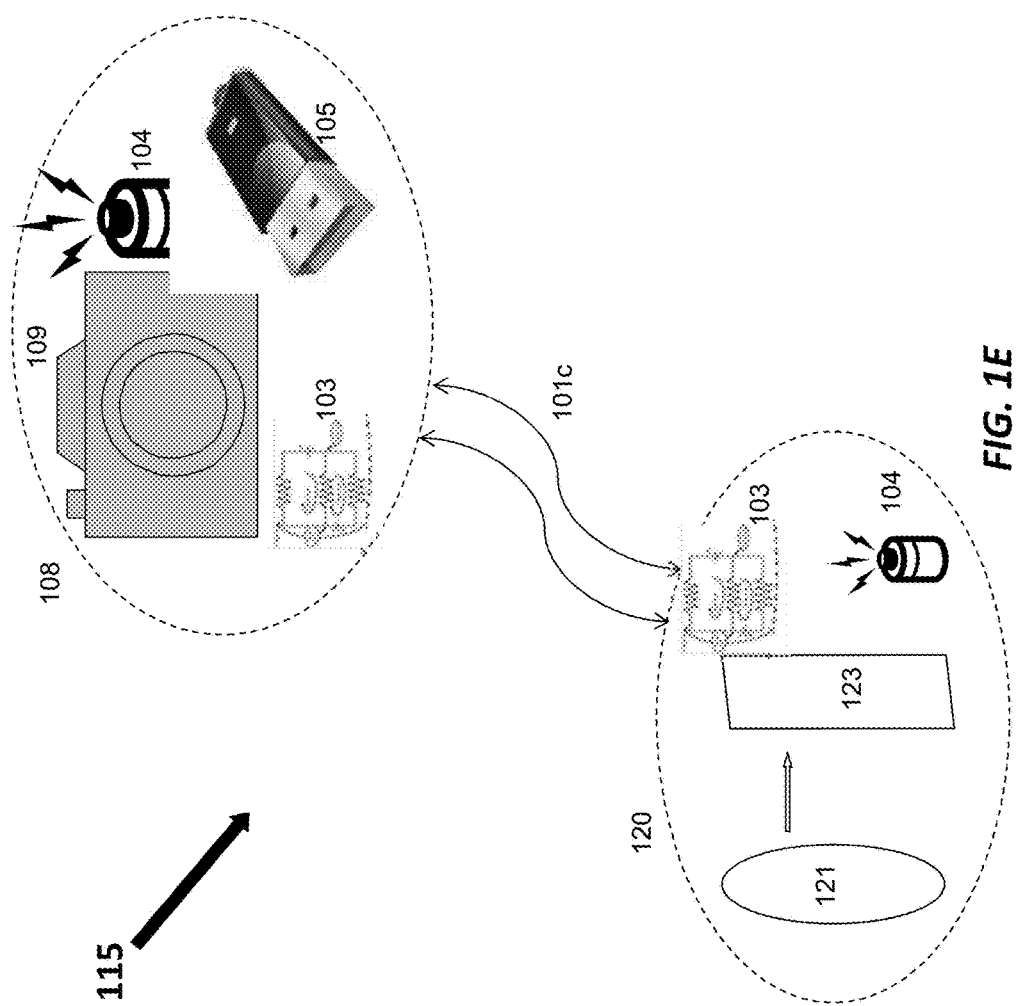

In some embodiments, the non-optical unit of the imaging device is not mechanically coupled to the optical unit of the imaging device, as illustrated in FIGS. 1C-1E by other mean including but not limited to wireless 101c communication between the optical unit and the non-optical unit. Such wireless means of communication include electromagnetic telecommunications, (i.e.: radio), and point-to-point, or point-to-multi-point wireless networking, or alternately, light (e.g.: infrared), magnetic, or electric fields.

In some embodiments, such as illustrated in FIGS. 1C-1E, the optical unit 120 of the imaging device 115 further comprises at least one of a filter (not shown), positional sensor (not shown), storage medium 105, battery 104, zooming motor (not shown), circuitry 103, power supply (alternately 104), processor (not shown), or housing (not shown). Because the major components of the imaging device have been separated for this apparatus, it may be necessary to individually configure each major component with various sub-components, which may or may not be redundant to the other major component(s). Examples may include; positional sensors, storage media 105, a source of power 104, etc. Alternatively, some components will rarely if ever be needed in all major components. In still other embodiments, the optical unit of the imaging device further comprises a weight adapted to provide stability for the optical unit. Depending on the application and physical density, any number of sub-components may act in the dual capacity of a weight and their alternate, intended function. For example, in some embodiments, the weight may comprise a battery 104.

In some embodiments, the non-optical 108 unit does not include a lens 121, or a photosensor 123, as illustrated in FIGS. 1B-1E. In other embodiments, the non-optical unit of the imaging device comprises at least one of a positional sensor (not shown), storage medium 105, battery 104, motors (not shown), circuitry 103, power supply, processor (not shown), or housing 109.

In some embodiments, at least one of the first rotational axis 102 and the second rotational axis 104 corresponds to a pitch, roll or yaw axis of the optical unit. In other embodiments, the frame assembly is further configured to permit the optical unit to rotate about a third rotational axis 106. In some embodiments, the third rotational axis corresponds to at least one of a pitch, roll, or yaw axis of the optical unit. Although specific axes of rotation have been illustrated in FIG. 1, one of skill in the art would recognize that the axes of rotation can be randomly substituted, as appropriate, to meet the needs of a given application; meaning X-axis (pitch) rotation can be substituted with Y-axis (roll) rotation, or Z-axis (yaw) rotation can be substituted with X-axis (pitch) rotation, etc.

Still further, in some embodiments, the apparatus further comprises one or more positional sensors 122, wherein at least one of the one or more positional sensors is configured to detect state information associated with the optical unit 120. In addition the apparatus further comprises a controller for generating one or more motor signals 124 based on the state information associated with the optical unit. In some embodiments, the state information comprises translational or rotational movement information or positional information.

In still other embodiments, at least one of the positional sensors is configured to detect state information associated with the non-optical unit. This is useful for orienting the image generated by the imaging device in space, e.g., especially when the non-optical unit is mounted on a base (e.g.: 107) that may represent the horizontal or vertical axis of a carrier device.

In still further embodiments, at least one of the one or more positional sensors is configured to measure movement associated with at least a pitch, roll, or yaw axis of the optical unit. In addition, at least one of the one or more positional sensors comprises an inertial sensor.

Figure 2:
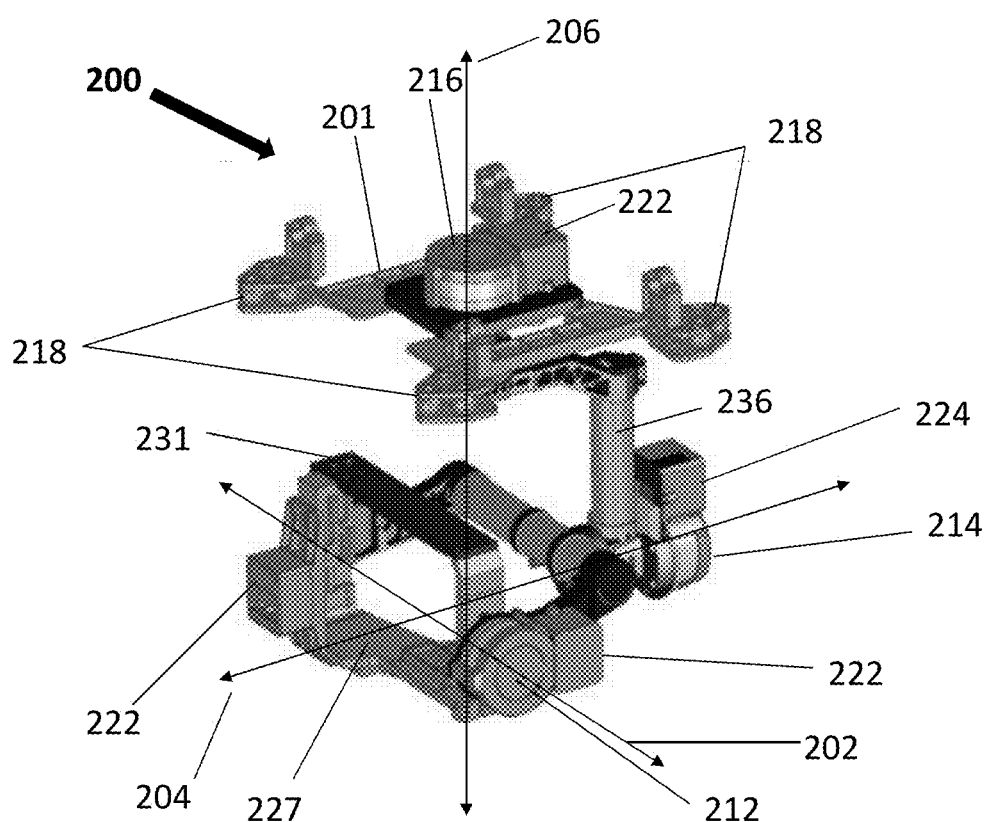
FIG. 2 is an illustrative isometric view of an exemplary 3-axis stabilizing apparatus assembly
Figure 3:
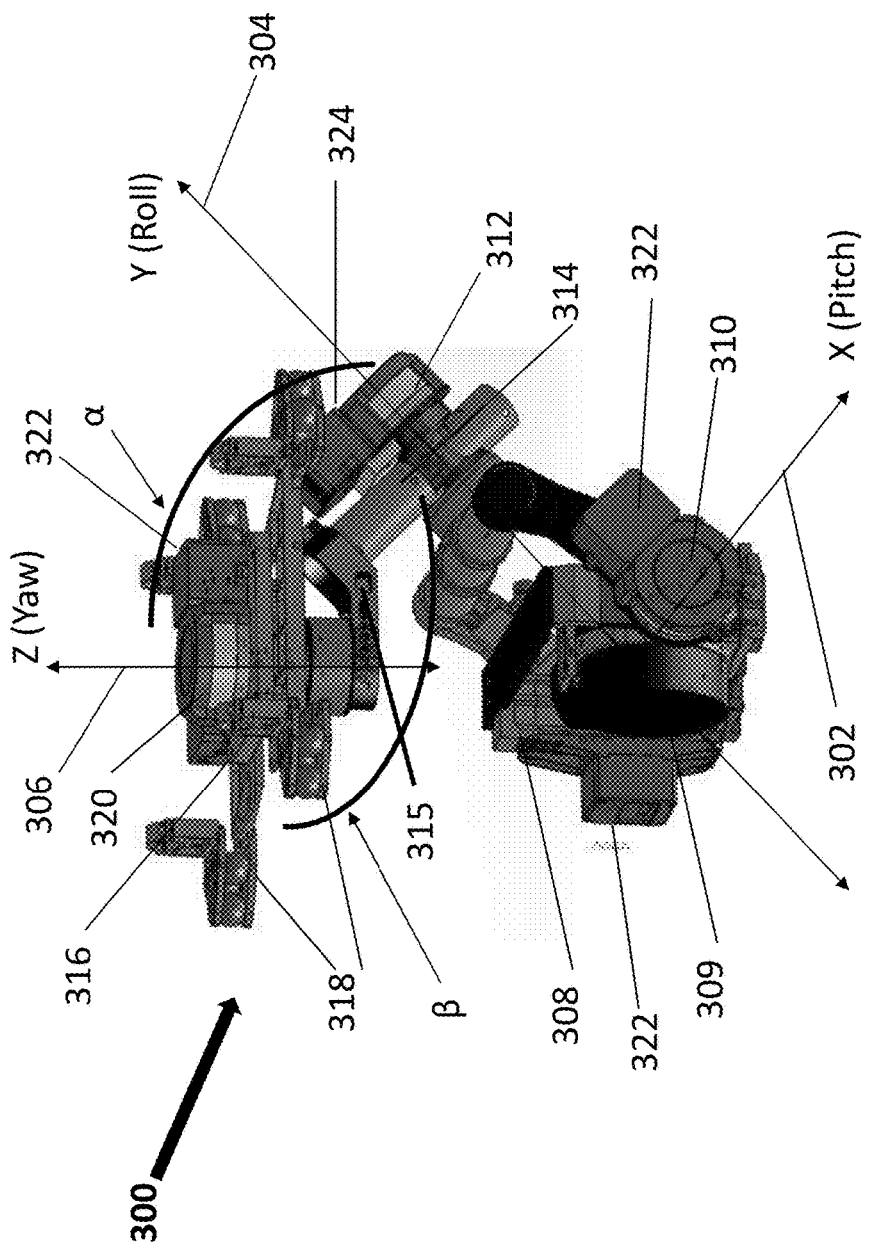
FIG. 3 is an illustrative isometric view of an exemplary non-orthogonal 3-axis stabilizing apparatus assembly with an optical unit.
Figure 4:
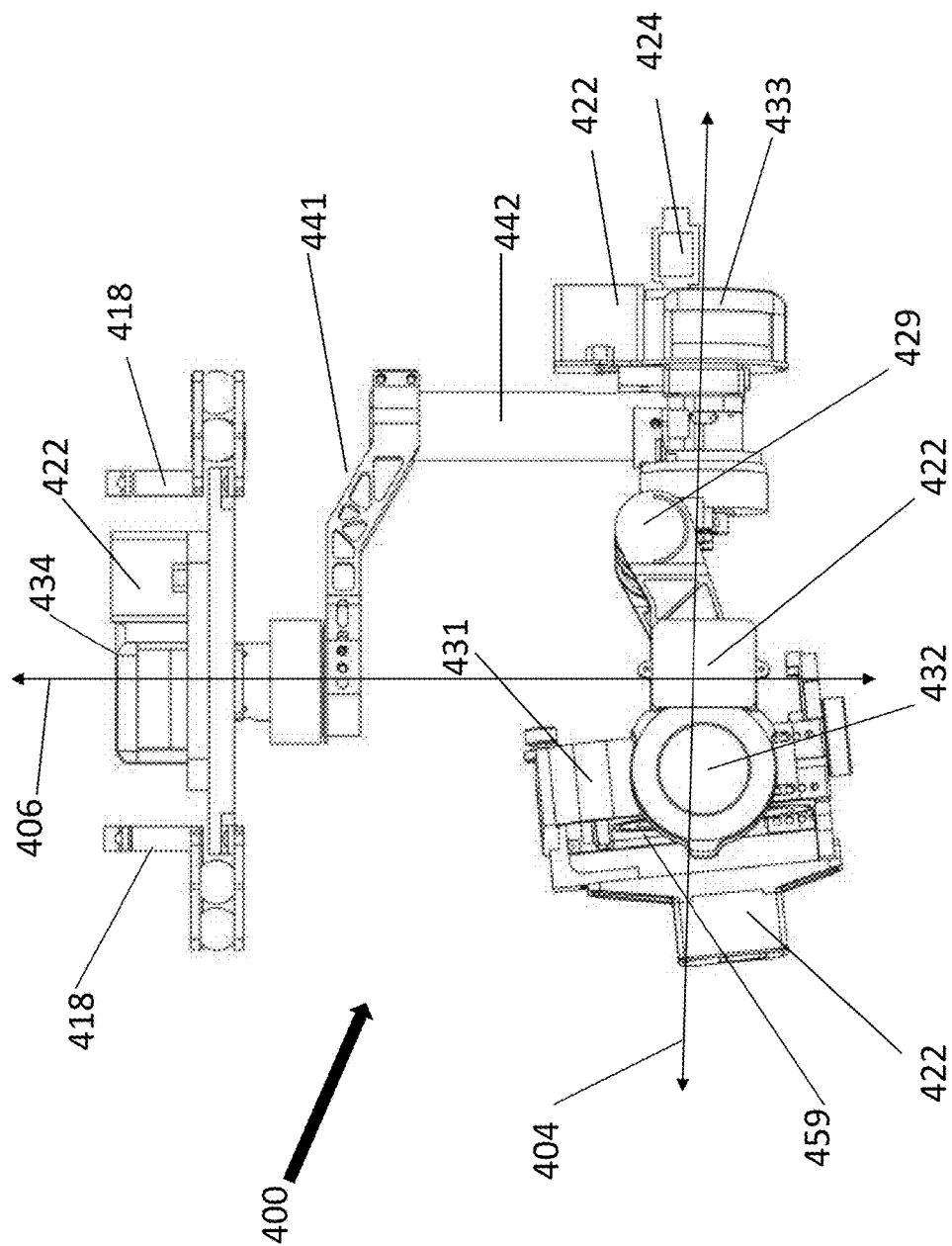
FIG. 4 is a side view of FIG. 2 illustrating an exemplary orthogonal 3-axis stabilizing apparatus assembly with an optical unit.

In any one of the preferred embodiments as illustrated in FIGS. 2, 3, 4, the rotational (pitch) axis X 202 of the first frame member mounting base 227 is orthogonally disposed relative to the rotational (roll) axis Y 204, for example, to allow the motors to easily and timely adjust the rotation of the frame assembly. In other embodiments, the rotational axes may not be orthogonally disposed to each other such as in FIG. 3.

In some embodiments, as illustrated in FIG. 4, the rotational (roll) axis X 404 is orthogonally disposed relative to the rotational (yaw) axis Y 406, for example, to allow the motors to easily and timely adjust the rotation of the frame assembly. In other embodiments, the rotational axes may not be orthogonally disposed to each other such as in FIG. 3.

To further increase the stability for the payload device, the center of gravity of the first frame member mounting base 308 and the payload device 309 as a whole is preferably located on the rotational (pitch) axis X 302 of the first frame member, as illustrated in FIG. 3. In some embodiments, the pitch axis intersects with the payload device 309. It is appreciated that when the center of gravity of the first frame member and the payload device 309 is positioned on the rotational axis X 302 of the first frame member, the rotation of the first frame member does not generate any torque. In other words, the first frame member is not likely to have any swing movement caused by the torque. Thus, the stability of the payload device is enhanced during rotation. In addition, in the preferred embodiment, when the carrier is moving smoothly, that is, when little or no motor drive stabilization is required, the first frame member and the payload device 309 is also in a dynamically balanced state.

Similarly, to provide enhanced stability and avoid torque generated by rotation around the rotational Y (roll) axis 304, in a preferred embodiment and as shown in FIG. 3, the center of gravity of the first frame member, the second frame member and the payload device 309 as a whole is located on the rotational axis Y 304 of the second frame member. In some embodiments, the rotational Y (roll) axis 304 intersects with the payload device 309.

It is also appreciated that in the afforementioned configuration of the frame assembly can provide near limitless ranges of motion for axes 1, 2, or 3, allowing for rotational swings of X, Y or Z axes, individually or together, in ranges from 0-360 degrees or more, allowing the payload device 309 to circumferentially rotate (e.g., up to 360 degrees, 720 degrees, or more, in any axis), for example, in order to perform panoramic photography.

In any of the preceding and subsequent embodiments, the apparatus can be configured to be coupled to a movable object. In some embodiments, the fixing points 118, 218, 318, 418 may be used to mount the mointing base 201 to or to facilitate the carrying of the stabilizing platform by a carrier, such as an aerial vehicle, motor vehicle, ship, robot, human, or any other movable object. As another example, the mointing base 201 may be handheld by a human, for example, to perform dynamic videography or photography.

A moveable object may be anything that can move relative to the earth. For example, moveable objects can be a wheeled-vehicle; a tracked-vehicle; a sliding or sledded vehicle; an aircraft; a hovercraft; a watercraft; or a spacecraft. Alternatively, a moving object can be a human being; a mammal; an aquatic animal; an amphibious animal; a reptile; a bird; or an invertebrate animal. Still further, a moving object can be relatively fixed, but still capable of movement, such as a tree, pole, or even a building that may be subject to swaying or vibration due to wind or even earthquakes.

In addition, the apparatus is configured to reduce relatively more movement experienced by the optical unit caused by the movable object than the amount of movement experienced by the non-optical unit. This movement can include but limit one of vibration, shock, sway, tremor, shaking, or jerking movement. In some embodiments, the apparatus for stabilizing an imaging device comprising an optical unit and a non-optical unit is configured to be handheld. Such apparatus can produce a more stable platform for vibration-resistant or even vibration-free imagery by, e.g., isolating the optical unit of an imaging device. Since a large proportion of the overall weight of an imaging device is associated with components and sub-components that are not directly associated with the lens and photosensor, the apparatus is designed to provide better vibration dampening and higher response rates to the smaller and lighter components of the optical unit alone.

Still further, as specifically illustrated in FIG. 1, or implied in any of the preceding or subsequent embodiments, the frame assembly comprises a first stage connected to and supporting the optical unit, a second stage movable relative to the first stage, and the optical unit about the first rotational axis. In addition, the frame assembly can further comprise a third stage movable relative to the second stage about the second rotational axis.

Figure 5A:
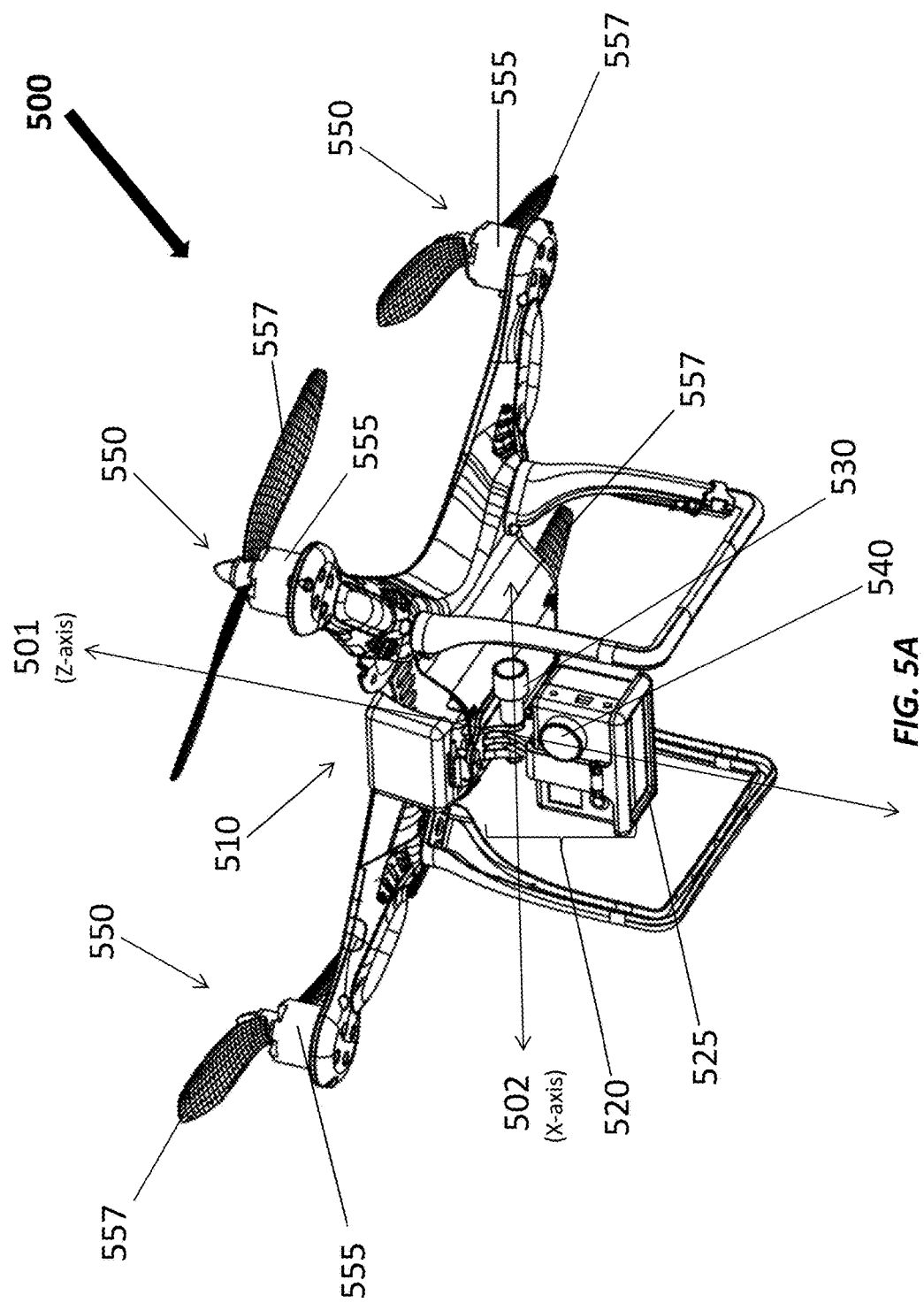
FIG. 5A is an illustrative ISO view of an exemplary aerial vehicle with a 2-axis stabilizing apparatus assembly comprising an imaging device mounted on the frame.
Figure 5B:
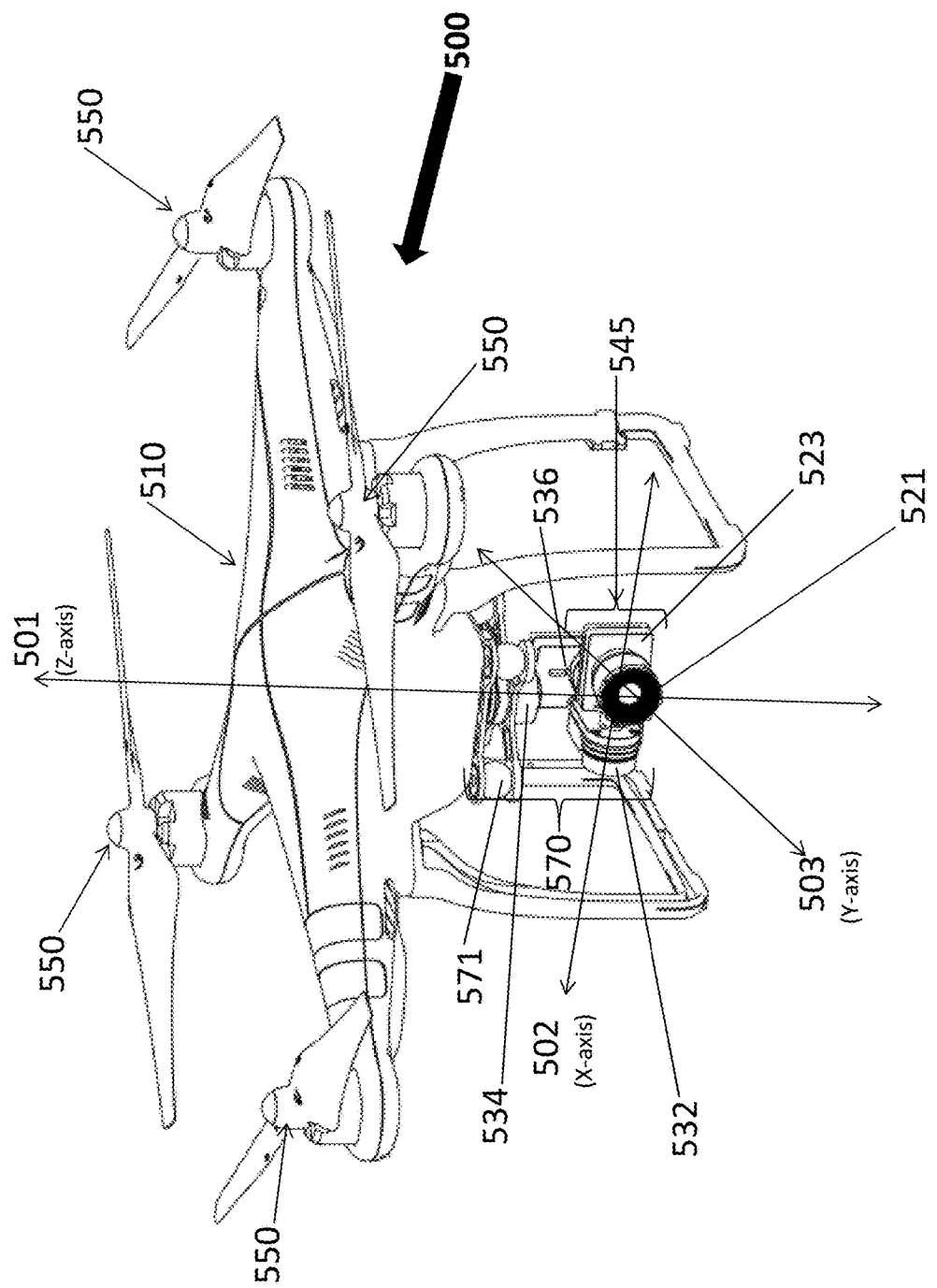
FIG. 5B is an illustrative ISO view of an exemplary aerial exemplary vehicle with a 3-axis stabilizing apparatus assembly supporting the optical unit an imaging device mounted on the frame.

As further illustrated in FIG. 1, provided herein is an apparatus for stabilizing at least a portion of an imaging device that comprises an optical unit and a non-optical unit, said apparatus comprising a frame assembly having a volume that is less than that of a frame assembly required to support the entire imaging device having the optical unit and the non-optical unit as potentially illustrated in FIGS. 4 and 5B, wherein the frame assembly is configured to support the optical unit 120 of the imaging device, wherein the frame assembly is configured to permit rotation of the optical unit about at least a first rotational axis 102 and a second rotational axis 104, and wherein the optical unit comprises at least a lens 121 and a photosensor 123 that is optically coupled to the lens; and wherein the motor assembly 112 or 114 (not shown) is configured to drive the frame assembly 110 so as to permit rotation of the optical unit 120 about at least the first rotational axis 102 or the second rotational axis 104.

In some embodiments, a frame assembly has a volume that is preferably one half or less than that of a frame assembly required to support the entire imaging device. For example, miniaturized components of the optical unit, described herein, and illustrated in FIG. 1, have the following proportions, wherein a 1/2.33" photosensor having an imaging area of 6.13×4.6 mm, weighs 0.6 g. The entire optical unit (photosensor lens and structure used secure lens and photosensor), plus a three-axis gyroscope and three-axis accelerometer, weigh about 15 g. The overall dimensions would be approximately 2.5 cm×1.8 cm×3 cm. The non-optical unit of an imaging system designed to work with this optical unit would have the outer dimension volumes of 77 mm×67 mm×80 mm, and have a total weight of 80 g (excluding the optical component). In addition, the motor along each axis of a 3-axis frame assembly has a rated power of only about 2 w. The invention described herein compares very favorably to other successful "compact" imaging systems having a 1/2.33" photosensor such as one by GoPro® , wherein the dimensions are 58.4×38.1×20.3 mm and the weights are approximately 75 g. For stabilizing the whole GoPro camera, currently existing 2-axis platforms weigh 200 g (excluding the camera), with an outer dimensional volume of 93 mm×85 mm×100 mm. The much larger motors required to drive the larger frames require 5 w power levels for each motor along each axis.

By separating the optical unit from the non-optical unit, the volume of the frame assembly required for stabilization is less than that is required to support the entire imaging device. In some embodiment, the volume of the frame assembly is reduced by 10%, 20%, 30%, 40%, 50%, 60%, 70%, 100% or more as compared to the volume of a frame assembly for supporting the entire imaging device. In other embodiments, the volume of the frame assembly is merely ½, ⅓, ¼, ⅕ or less of that is required for supporting the entire imaging device having the optical and non-optical units as a whole.

In other embodiment, the minimum amount of the energy required by a subject motor to drive the subject frame assembly is less than that is required to drive a frame assembly supporting the entire imaging device. In some embodiments, the motor consumes a minimum amount of energy that is 90%, 80%, 70%, 60%, 50%, 40%, 30%, 20%, 10% or even less than that which is required for a motor driving a frame assembly supporting the whole imaging device (e.g., with optical and the non-optical units as an integral piece). In some embodiments, the minimum amount of energy required by the subject motor is less than 5 W, 4 W, 3 W, 2 W, 1 W power to drive along an axis of a frame assembly.

In some embodiments the non-optical unit of the imaging device 115 is not mechanically coupled to the apparatus. In some embodiments the optical unit and the non-optical unit are electrically coupled. In some embodiments the optical unit and the non-optical unit are movable relative to each other. As shown in FIG. 1, when the optical unit and non-optical unit are physically separated, and physically located on separate mounting bases, and/or separate axes of a multi-axis apparatus, such as described herein, the optical unit and non-optical unit will move relative to each other, by design.

As previously described, in some embodiments, the non-optical unit 108 of the imaging device 115 is not mechanically coupled to the optical unit of the imaging device, as illustrated in in FIGS. 1B-1E. Employing any one of a variety of available communication technologies, the apparatus described herein can employ a means of wireless communication 101c between the optical unit and the non-optical unit. Such wireless means of communication include electromagnetic telecommunications, (i.e.: radio), and pointto-point, or point-to-multi-point wireless networking, or alternately, light (e.g.: infrared), magnetic, or electric fields.

In some embodiments the optical unit 120 of the imaging device 115 further comprises at least one of a filter, positional sensor, storage medium, battery, zooming motor, circuitry, power supply, processor, or housing. In still other embodiments, the optical unit of the imaging device further comprises a weight adapted to provide stability for the optical unit. In still other embodiments, the weight comprises a battery.

In some embodiments, the non-optical unit does not include a lens or a photosensor. In other embodiments, the non-optical unit of the imaging device comprises at least one of a positional sensor, storage medium, battery, motors, circuitry, power supply, processor, or housing.

In some embodiments, at least one of the first rotational axis and the second rotational axis corresponds to a pitch, roll or yaw axis of the optical unit. In other embodiments, the frame assembly is further configured to permit the optical unit to rotate about a third rotational axis. In some embodiments, the third rotational axis corresponds to at least one of a pitch, roll, or yaw axis of the optical unit.

Still further, in some embodiments, the apparatus further comprises one or more positional sensors, wherein at least one of the one or more positional sensors is configured to detect state information associated with the optical unit. In addition the apparatus further comprises a controller for generating one or more motor signals based on the state information associated with the optical unit. In some embodiments, the state information comprises translational or rotational movement information or positional information.

In still other embodiments, at least one of the positional sensors is configured to detect state information associated with the non-optical unit.

In still further embodiments, at least one of the one or more positional sensors is configured to measure movement associated with at least a pitch, roll, or yaw axis of the optical unit. In addition, at least one of the one or more positional sensors comprises an inertial sensor.

In any of the stated embodiments, the apparatus is configured to be coupled to a movable object. A moveable object may be anything that can move relative to the earth. For example, moveable objects can be a wheeled-vehicle; a tracked-vehicle; a sliding or sledded vehicle; an aircraft; a hovercraft; a watercraft; or a spacecraft. Alternatively, a moving object can be defined as a human being; a mammal; an aquatic animal; an amphibious animal; a reptile; a bird; or an invertebrate animal. Still further, a moving object can be relatively fixed, but still capable of movement, such as a tree, pole, or even a building that may be subject to swaying or vibration due to wind or even earthquakes.

In addition, the apparatus is configured to reduce relatively more movement experienced by the optical unit caused by the movable object than the amount of movement experienced by the non-optical unit. This movement is often described as one of vibration, shock, sway, tremor, shaking, or jerking movement. In some embodiments, the apparatus for stabilizing an imaging device comprising an optical unit and a non-optical unit is configured to be handheld. More specifically, a novel aspect of the apparatus is the inherent ability to uniquely isolate the optical unit thus producing a more stable platform for vibration-free imagery. Since a large proportion of the overall weight of an imaging device is associated with components and sub-components that are not directly associated with the lens and photosensor, the apparatus is designed to provide better vibration dampening and higher response rates to the smaller and lighter components of the optical unit alone.

As stated previously, the apparatus is configured to be coupled to a movable object. In addition, the apparatus is configured to reduce relatively more movement experienced by the optical unit caused by the movable object than the amount of movement experienced by the non-optical unit. In some embodiments, the apparatus for stabilizing at least a portion of an imaging device comprising an optical unit and a non-optical unit is configured to be handheld.

Still further, in any of the preceding embodiments, the frame assembly comprises a first stage connected to and supporting the optical unit, and a second stage movable relative to the first stage and the optical unit about the first rotational axis. In addition, the frame assembly can further comprise a third stage movable relative to the second stage about the second rotational axis.

Provided herein is an apparatus for stabilizing at least a portion of an imaging device that comprises an optical unit and a non-optical unit, said apparatus comprising: a frame assembly supporting the optical unit of the imaging device, wherein the frame assembly is configured to permit rotation of the optical unit about at least a first rotational axis and a second rotational axis, and wherein the optical unit comprises at least a lens and a photosensor that is optically coupled to the lens; and a motor assembly operably connected to the frame assembly, wherein the motor assembly is configured to drive the frame assembly so as to permit rotation of the optical unit about at least the first rotational axis or the second rotational axis, and wherein the motor assembly consumes a minimum amount of energy that is less than that required to drive a frame assembly supporting the entire imaging device.

As further illustrated in FIG. 1, in a preferred embodiment, the motor assembly will preferably consume no more than one half of the amount of energy than that of a motor assembly required to drive a frame assembly supporting the entire imaging device.

Referring to the previous Example 1, the motor along each axis of a 3-axis frame assembly of the subject invention has a rated power of only about 2 w. An alternative illustrative embodiment for a 3-axis frame is illustrated in FIG. 2, (no imaging device shown).

Figure 6:
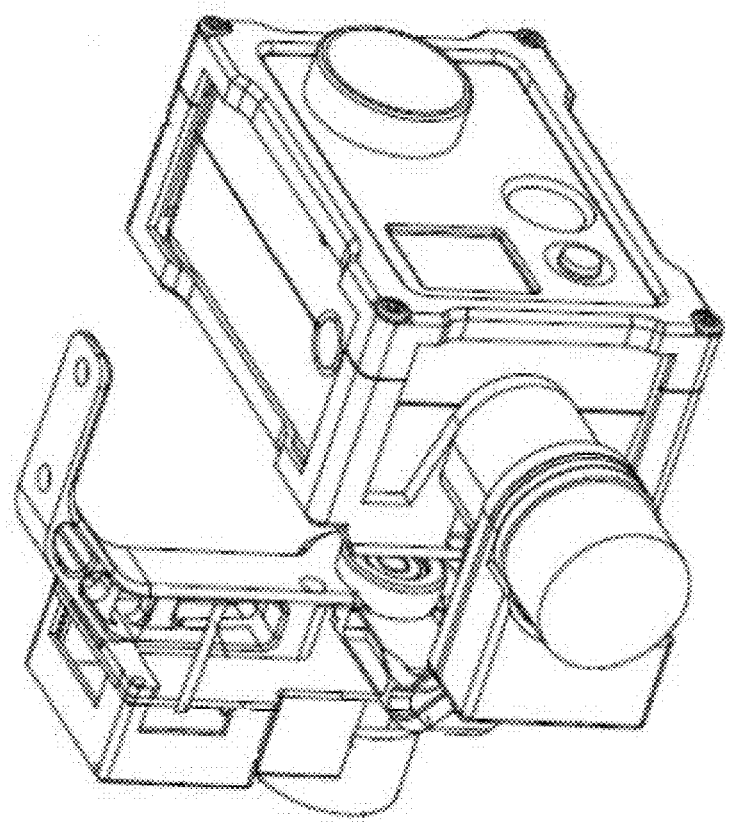
FIG. 6 is an illustrative view of an exemplary 2-axis stabilizing frame assembly an entire imaging device.

Whereas by comparison, the motors required to drive the referenced 2-axis frame assembly for a comparable "compact" GoPro camera are significantly larger. The much larger motors required to drive the larger 2-axis frames require 5 w power levels for each motor along each axis. An example of larger 2-axis frame required for a comparable frame assembly supporting the entire imaging device is seen in FIG. 6.

In some embodiments the non-optical unit of the imaging device is not mechanically coupled to the apparatus. In some embodiments the optical unit and the non-optical unit are electrically coupled. In some embodiments the optical unit and the non-optical unit are movable relative to each other.

As previously described, in some embodiments, the non-optical unit of the imaging device is not mechanically coupled to the optical unit of the imaging device. Employing any one of a variety of available communication technologies, the apparatus described herein can employ a means of wireless communication between the optical unit and the non-optical unit. Such wireless means of communication include electromagnetic telecommunications, (i.e.: radio), and point-to-point, or point-to-multi-point wireless networking, or alternately, light (e.g.: infrared), magnetic, or electric fields.

In some embodiments the optical unit of the imaging device further comprises at least one of a filter, positional sensor, storage medium, battery, zooming motor, circuitry, power supply, processor, or housing. In still other embodiments, the optical unit of the imaging device further comprises a weight adapted to provide stability for the optical unit. In still other embodiments, the weight comprises a battery.

In some embodiments, the non-optical unit does not include a lens or a photosensor. In other embodiments, the non-optical unit of the imaging device comprises at least one of a positional sensor, storage medium, battery, motors, circuitry, power supply, processor, or housing.

In some embodiments, at least one of the first rotational axis and the second rotational axis corresponds to a pitch, roll or yaw axis of the optical unit. In other embodiments, the frame assembly is further configured to permit the optical unit to rotate about a third rotational axis. In some embodiments, the third rotational axis corresponds to at least one of a pitch, roll, or yaw axis of the optical unit.

Still further, in some embodiments, the apparatus further comprises one or more positional sensors, wherein at least one of the one or more positional sensors is configured to detect state information associated with the optical unit. In addition the apparatus further comprises a controller for generating one or more motor signals based on the state information associated with the optical unit. In some embodiments, the state information comprises translational or rotational movement information or positional information.

In still other embodiments, at least one of the positional sensors is configured to detect state information associated with the non-optical unit.

In still further embodiments, at least one of the one or more positional sensors is configured to measure movement associated with at least a pitch, roll, or yaw axis of the optical unit. In addition, at least one of the one or more positional sensors comprises an inertial sensor.

In some of the preceding embodiments, the apparatus is configured to be coupled to a movable object. In addition, the apparatus is configured to reduce relatively more movement experienced by the optical unit caused by the movable object than the amount of movement experienced by the non-optical unit. In some embodiments, the apparatus for stabilizing at least a portion of an imaging device comprising an optical unit and a non-optical unit is configured to be handheld.

Still further, in some of the preceding embodiments, the frame assembly comprises a first stage connected to and supporting the optical unit, and a second stage movable relative to the first stage and the optical unit about the first rotational axis. In addition, the frame assembly can further comprise a third stage movable relative to the second stage about the second rotational axis.

In some embodiments of the apparatus, said energy is less than the amount of energy required to drive the frame assembly when the entire imaging device apparatus as a whole is supported by the frame assembly.

In some embodiments wherein an apparatus for stabilizing at least a portion of an imaging device that comprises an optical unit and a non-optical unit, and wherein the motor assembly consumes a minimum amount of energy that is less than that required to drive a frame assembly supporting the entire imaging device, said energy is less than the amount of energy required to drive the frame assembly when the entire imaging device apparatus as a whole is supported by the frame assembly.

As suggested above, at least one embodiment of the apparatus comprises a frame assembly configured to support an entire imaging device, wherein the components have been separated and are placed at different locations on the frame. For example, as shown in FIG. 1, the non-optical unit is placed on the base 107, on the Z-axis frame, whereas the optical unit is connected to the X-axis frame. In this configuration, the mass of the non-optical component can be completely isolated from the optical unit, thus allowing for a mixture of frame assembly components, with larger motors and frame base on the Z-plane, and the use of smaller configuration frame components below the Z-plane and subsequently use motors that consume less energy to drive the frame controlling only the optical unit movements. This example is only meant as one illustrative example of the numerous possible configurations and sub-configurations which are now possible.

Provided herein is an imaging device comprising an optical unit 309 which comprises at least a lens and a photosensor that is optically coupled to the lens; and a non-optical unit that is electrically coupled to the optical unit (not-shown), wherein the optical unit is movable relative to the non-optical unit via actuation of a frame assembly 300 coupled to said optical unit, as previously illustrated in FIG. 1.

In some embodiments, the non-optical unit is not mechanically coupled to the frame assembly. As shown in FIG. 3, a representative three-axis frame assembly 300 is illustrated with an optical unit 309 coupled to the X-axis 302 of the frame in a carrier bracket 308, however, the non-optical unit is remotely located somewhere off the frame. As described previously, the non-optical unit and optical unit are illustrated in a wireless communication set-up.

As with prior examples, the illustrative frame has drive motors 310, 312, 320 with positional sensors 322 and a at least one controller 324 for generating one or more motor signals for driving the movement of the frame assembly of the apparatus, based on the state information generated by the sensors.

Further, as illustrated by rotational symbols $\alpha$ and $\beta$ the portion of the frame assembly controlling the movement of the optical unit has freedom to move in a rotation angle ($\alpha$) between Z 306 (yaw) & Y 304 (roll) axes, and in non-right angle of rotation ($\beta$), resulting in net attitudinal translational movement separate from the non-optical unit, whether the non-optical unit is coupled to the frame or located remotely.

Additionally, FIG. 3 and FIG. 4 illustrate a means for alternative translational and additudinal movement by providing additional rotation arms 314, 429, 442 and supporting arm extensions 315, 441 respectively, which further illustrate relative movement that is capable between the optical and non-optical units of the imaging device and also provide greater range of movement within the frame itself.

In some embodiments, the optical unit further comprises at least one of a filter, positional sensor, storage medium, battery, zooming motor, circuitry, power supply, processor, or housing. In other embodiments, the optical unit further comprises a weight adapted to provide stability for the optical unit. In some embodiments the weight comprises a battery.

In some embodiments, the non-optical unit does not include a lens or a photosensor. In other embodiments, the non-optical unit of the imaging device comprises at least one of a positional sensor, storage medium, battery, motors, circuitry, power supply, processor, or housing.

In some embodiments of the imaging device, the optical unit 309, is movable about a first rotational axis 302 and a second rotational axis 304 via the actuation of the frame assembly and the optical unit is movable about a third rotational axis 306 via the actuation of the frame assembly.

In other embodiments of the imaging device, the optical unit is movable about a third rotational axis via the actuation of the frame assembly and the third rotational axis corresponds to at least one of a pitch, roll, or yaw axis of the optical unit.

In still further embodiments of the imaging device, the state information associated with the optical unit is detectable by one or more positional sensors 322 and said state information associated with the optical unit is used to generate one or more motor signals via the controller 324 that drive the actuation of the frame assembly. Said state information comprises translational or rotational movement information or positional information. In addition, state information associated with the non-optical unit is detectable by one or more positional sensors.

In still further embodiments of the imaging device, at least one of the one or more positional sensors is configured to measure movement associated with at least a pitch, roll, or yaw axis of the optical unit, and at least one of the one or more positional sensors comprises an inertial sensor.

In some embodiments, the frame assembly of the imaging device is configured to be coupled to a movable object. As illustrated in FIGS. 3 and 4 multiple fixing points 318, 418 are provide on a Z-axis base 316, as one possible location for coupling a frame assembly to a moveable object.

In some embodiments of the imaging device, the optical unit and the non-optical unit are contained within a single housing. As shown in FIG. 4, a miniaturized imaging device 459 is contained within the carrier bracket 431 and driven about a first axis with a first driving member 432 and one or more positional sensors 422. In other embodiments, the optical unit and the non-optical unit are not contained within a single housing. In this embodiment, the imaging device has a complete range of multi-axis rotational and translational movement with the ability to pivot about a first rotating axis 429 and the rotational axis of the first driving member 432. Additionally, roll motion is provided by the second drive motor and positional sensor 433, 422, with motor signal provided by controller 424. And finally, yaw motioon is provided by a third drive motor 434 and positional sensor 422, allowing the imaging device to pivot about the extension arms 441, and 442.

In still other embodiments of the imaging device 459, the optical unit and the non-optical unit are both utilized to capture and store an image.

As shown in FIG. 5A, a representative aerial vehicle 500 is provided comprising a vehicle body 510 and an apparatus for stabilizing an imaging device attached to the vehicle body comprising; an optical unit and a non-optical unit, said apparatus comprising; a frame assembly 520 having a mounting member 525, rotatably coupled to the optical unit of the imaging device 540, and supporting the entire imaging device as a whole, wherein the frame assembly is configured to permit the imaging device to rotate about at least a first rotational axis 501 and a second rotational axis 502, the optical unit comprising at least a lens 521 (not shown), and a photosensor 523 (not shown) that is optically coupled to the lens; and a motor assembly 530 coupled to the frame assembly, the motor assembly configured to directly drive the frame assembly so as to permit the optical unit to rotate about at least the first rotational axis or the second rotational axis.

Figure 5C:
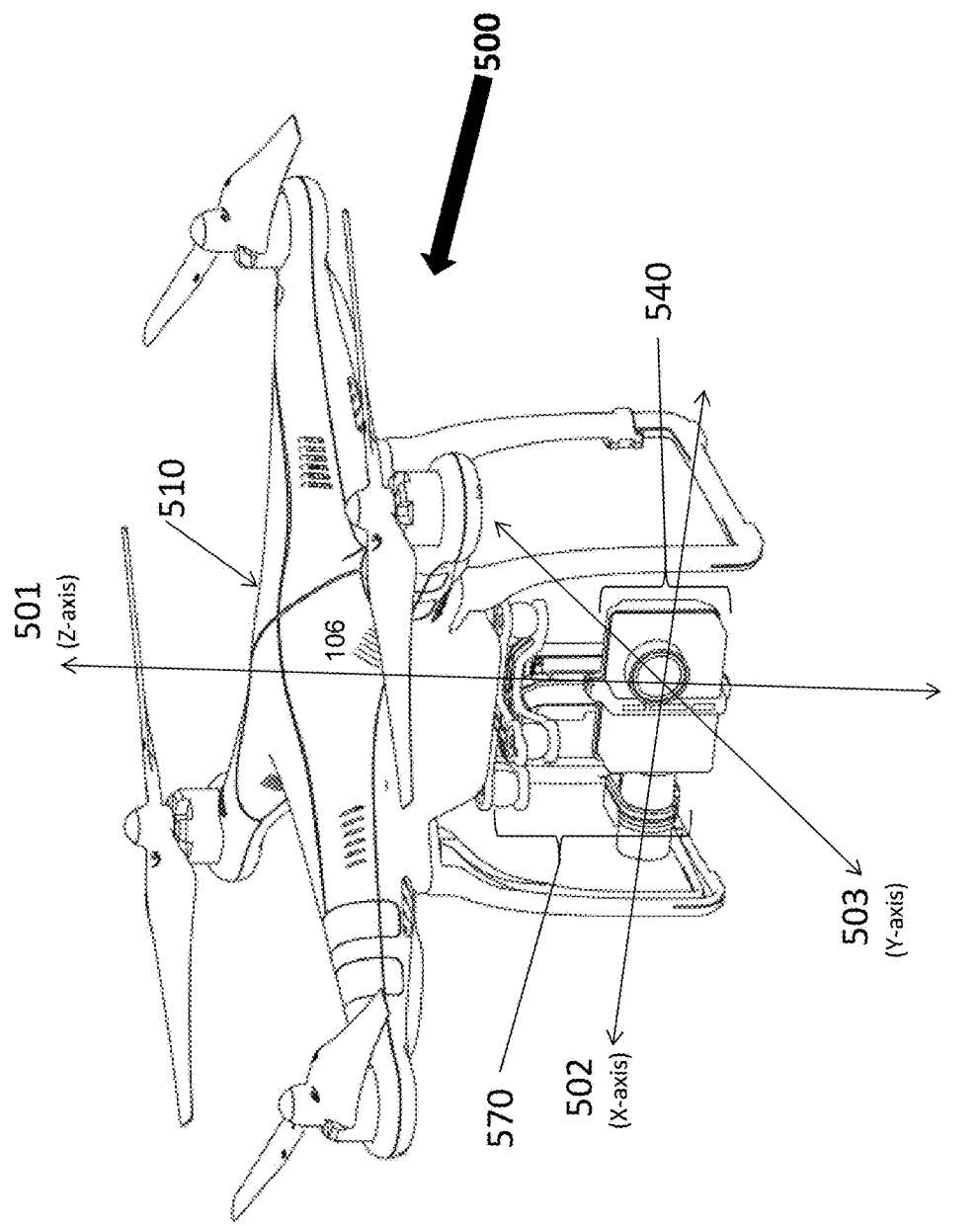
FIG. 5C is an illustrative ISO view of an exemplary aerial vehicle with a 3-axis stabilizing apparatus assembly supporting an entire imaging device mounted on the frame.

Optionally, the device is configured with a third motor assembly 536 coupled to the frame assembly, the motor assembly configured to directly drive the frame assembly 570 so as to permit the optical unit 545 to rotate about a third rotational axis 503, as illustrated in FIGS. 5B and 5C.

Provided herein is an aerial vehicle comprising a vehicle body and an apparatus for stabilizing at least a portion of an imaging device attached to the vehicle body that comprises; an optical unit and a non-optical unit, said optical unit and non-optical unit constituting the entire imaging device, said apparatus comprising; a frame assembly having a volume that is less than that of a frame assembly required to support the entire imaging device having the optical unit and the non-optical unit, wherein the frame assembly is configured to support the optical unit of the imaging device, wherein the frame assembly is configured to permit rotation of the optical unit about at least a first rotational axis and a second rotational axis, and wherein the optical unit comprises at least a lens and a photosensor that is optically coupled to the lens; and a motor assembly operably connected to the frame assembly, wherein the motor assembly is configured to drive the frame assembly so as to permit rotation of the optical unit about at least the first rotational axis or the second rotational axis. Optionally, the device is configured with a third motor assembly 536 coupled to the frame assembly, the motor assembly configured to directly drive the frame assembly 570 so as to permit the optical unit 545 to rotate about a third rotational axis 503, as illustrated in FIGS. 5B and 5C.

Preferably, as shown in FIG. 5B, the frame assembly 570 is configured to support the optical unit 545 of the imaging device, without supporting the entire imaging device 540 as a whole, wherein the frame assembly is configured to permit the optical unit to rotate about at least a first rotational axis 501 and a second rotational axis 502, and optionally a third rotational axis 503, the optical unit comprising at least a lens 521 and a photosensor 523 that is optically coupled to the lens; and motor assemblies 532, 534 coupled to the frame assembly, the motor assemblies configured to directly drive the frame assembly 570 so as to permit the optical unit 545 to rotate about at least the first rotational axis 502, or the second rotational axis 501. In addition, a third motor assembly 536 is coupled to the frame assembly, to permit the optical unit 545 to rotate about a third rotational axis 503.

Provided herein is an aerial vehicle comprising a vehicle body and an apparatus for stabilizing at least a portion of an imaging device attached to the vehicle body that comprises an optical unit and a non-optical unit, said optical unit and non-optical unit constituting the entire imaging device, said apparatus comprising; a frame assembly supporting the optical unit of the imaging device, wherein the frame assembly is configured to permit rotation of the optical unit about at least a first rotational axis and a second rotational axis, and wherein the optical unit comprises at least a lens and a photosensor that is optically coupled to the lens; and a motor assembly operably connected to the frame assembly, wherein the motor assembly is configured to drive the frame assembly so as to permit rotation of the optical unit about at least the first rotational axis or the second rotational axis, and wherein the motor assembly consumes a minimum amount of energy that is less than that required to drive a frame assembly supporting the entire imaging device.

In some embodiments of the aerial vehicle 500, said vehicle comprises an engine 555 configured to drive movement of said aerial vehicle. In some embodiments, the engine is configured within said vehicle body. In some embodiments, the engine is configured as a component of a rotor assembly 550.

According to another aspect of the present invention the apparatus for stabilizing at least a portion of an imaging device also comprises shock absorbers 571 such as illustrated in FIG. 5B. Shock absorbers can be placed strategically on the frame, preferably between the frame and the moving vehicle, at the moiunting surface, to insulate the imaging device, or more importantly, the optical unit from vibration, shock, sway, tremor, shaking, or jerking movement.

In some embodiments, the aerial vehicle is an unmanned aerial vehicle capable of controlled flight without requiring an occupant of the aerial vehicle.

In some embodiments, the aerial vehicle comprises one or more blades 557 configured to rotate to provide lift to the unmanned aerial vehicle.

In some embodiments of the aerial vehicle, the non-optical unit is supported by the vehicle body without being supported by the frame assembly. As illustrated in prior examples, and again in FIG. 5B, or FIGS. 1B-1E, the optical unit and non-optical units can be physically separated and communicate by either tethered (wired) 101 or wireless communication means 101c.

Provided herein is a method of stabilizing at least a portion of an imaging device that comprises an optical unit and a non-optical unit, said method comprising; supporting the optical unit of the imaging device using a frame assembly without supporting the entire imaging device as a whole, as illustrated in FIGS. 1A and 5B, wherein the frame assembly is configured to permit rotation of the optical unit about at least a first rotational axis and a second rotational axis, and wherein the optical unit comprises at least a lens and a photosensor that is optically coupled to the lens; and driving the frame assembly using a motor assembly operably connected to the frame assembly, thereby causing rotation of the optical unit about at least the first rotational axis or the second rotational axis.

In some embodiments of the stabilizing method, the optical unit and the non-optical unit are electrically coupled to each other.

In some embodiments of the stabilizing method, the optical unit 120, 540 further comprises at least one of a filter, positional sensor, storage medium 105, battery 104, zooming motor, circuitry 103, power supply, processor, or housing. In other embodiments of the method, the optical unit further comprises a weight adapted to provide stability for the optical unit. In some embodiments, the weight comprises a battery. In still further embodiments, the battery is configured to provide power necessary for operation of an aerial vehicle or the imaging device.

In some embodiments of the stabilizing method, the non-optical 108 unit does not include a lens or a photosensor. In other embodiments of the stabilizing method, the non-optical unit comprises at least one of a positional sensor, storage medium 105, power supply, battery 104, motors, circuitry 103, display, processor, or housing 109.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit 120 and non-optical unit 108.

Provided herein is a method of stabilizing at least a portion of an imaging device that comprises an optical unit and a non-optical unit, said optical unit and non-optical unit constituting the entire imaging device, said method comprising; supporting the optical unit of the imaging device using a frame assembly, the frame assembly having a volume that is less than that of a frame assembly required to support the entire imaging device having the optical unit and the non-optical unit, wherein the frame assembly is configured to permit rotation of the optical unit about at least a first rotational axis and a second rotational axis, and wherein the optical unit comprises at least a lens and a photosensor that is optically coupled to the lens; and driving the frame assembly using a motor assembly operably connected to the frame assembly, thereby causing rotation of the optical unit about at least the first rotational axis or the second rotational axis.

In some embodiments of the stabilizing method, the optical unit and the non-optical unit are electrically coupled to each other.

In some embodiments of the stabilizing method, the optical unit further comprises at least one of a filter, positional sensor, storage medium, battery, zooming motor, circuitry, power supply, processor, or housing. In other embodiments of the method, the optical unit further comprises a weight adapted to provide stability for the optical unit. In some embodiments, the weight comprises a battery 104. In still further embodiments, the battery is configured to provide power necessary for operation of an aerial vehicle or the imaging device.

In some embodiments of the stabilizing method, the non-optical 108 unit does not include a lens or a photosensor. In other embodiments of the stabilizing method, the non-optical unit comprises at least one of a positional sensor, storage medium, power supply, battery, motors, circuitry, display, processor, or housing.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit and non-optical unit.

Provided herein is a method of stabilizing at least a portion of an imaging device that comprises an optical unit and a non-optical unit, said method comprising; supporting the optical unit of the imaging device using a frame assembly, wherein the frame assembly is configured to permit rotation of the optical unit about at least a first rotational axis and a second rotational axis, and wherein the optical unit comprises at least a lens and a photosensor that is optically coupled to the lens; and driving the frame assembly using a motor assembly operably connected to the frame assembly, the motor assembly consuming a minimum amount of energy that is less than that required to drive a frame assembly supporting the entire imaging device, thereby causing rotation of the optical unit about at least the first rotational axis or the second rotational axis.

In some embodiments of the stabilizing method, the optical unit and the non-optical unit are electrically coupled to each other.

In some embodiments of the stabilizing method, the optical unit further comprises at least one of a filter, positional sensor, storage medium, battery, zooming motor, circuitry, power supply, processor, or housing. In other embodiments of the method, the optical unit further comprises a weight adapted to provide stability for the optical unit. In some embodiments, the weight comprises a battery. According to another aspect of the present invention, the battery is configured to provide power necessary for operation of an aerial vehicle or the imaging device.

In some embodiments of the stabilizing method, the non-optical unit does not include a lens or a photosensor. In other embodiments of the stabilizing method, the non-optical unit comprises at least one of a positional sensor, storage medium, power supply, battery, motors, circuitry, display, processor, or housing.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit and non-optical unit.

Provided herein is a method of stabilizing at least a portion of an imaging device, said method comprising providing an optical unit comprising at least a lens and a photosensor that is optically coupled to the lens; electrically coupling a non-optical unit to the optical unit; and moving the optical unit relative to the non-optical unit via actuation of a frame assembly coupled to said optical unit.

In some embodiments of the stabilizing method, the optical unit further comprises at least one of a filter, positional sensor, storage medium, battery, zooming motor, circuitry, power supply, processor, or housing. In other embodiments of the method, the optical unit further comprises a weight adapted to provide stability for the optical unit. In some embodiments, the weight comprises a battery. In still further embodiments, the battery is configured to provide power necessary for operation of an aerial vehicle or the imaging device.

In some embodiments of the stabilizing method, the non-optical unit does not include a lens or a photosensor. In other embodiments of the stabilizing method, the non-optical unit comprises at least one of a positional sensor, storage medium, power supply, battery, motors, circuitry, display, processor, or housing.

In still other embodiments of the stabilizing method, at least one of the first rotational axis and the second rotational axis corresponds to a pitch, roll, or yaw axis of the optical unit. In other embodiments, the method further comprises driving the frame assembly using the motor assembly, thereby causing rotation of the optical unit about a third rotational axis. Still further the method wherein the third rotational axis corresponds to at least one of a pitch, roll or yaw axis of the optical unit.

In yet other embodiments of the stabilizing method, said method comprises receiving a signal from at least one positional sensor for indicative of an inclination angle of the non-optical unit and/or the optical unit in order to correct an inclination angle of the optical unit. In still other embodiments, said method further comprises reducing more movement experienced by the optical unit than the amount of movement experienced by the non-optical unit. In some embodiments of the method, said movement comprises at least one of vibration, shock, sway, tremor, shaking, or jerking movement.

In any of the preceding embodiments of the stabilizing method, said method further comprises capturing and storing an image using both the optical unit and non-optical unit.

Provided herein is an aerial vehicle comprising a vehicle body and a frame assembly connected to said vehicle body, wherein said frame assembly comprises a battery attached thereto and said frame assembly is configured to hold and stabilize an imaging device having an optical unit, and wherein the battery is attached to the assembly at a location separate from that of the imaging device, and wherein the battery is configured to provide power for operation of the aerial vehicle or the imaging device.

In some embodiments, the battery is configured to provide power for operation of the aerial vehicle. In some embodiments the battery has a weight that provides stability to said optical unit of said imaging device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An aerial vehicle comprising:
   (a) a vehicle body coupled to one or more blades configured to provide lift to the aerial vehicle; and
   (b) an apparatus connected to the vehicle body and configured to stabilize at least a portion of an imaging device, said imaging device comprising (1) a first housing containing an optical unit comprising a lens and a photosensor, and (2) a second housing containing a non-optical unit and not the optical unit, wherein the non-optical unit is configured to permit wireless transmission of image data generated by the photosensor of the optical unit, said wireless communication comprising image data based on signals generated by the photosensor of the optical unit, wherein the apparatus comprises:
      (i) a frame assembly supporting the optical unit of the imaging device without supporting the non-optical unit of the imaging device, wherein the frame assembly comprises (A) a first frame member that supports the optical unit and an inertial measurement unit, and (B) a second frame member that bears weight of the first frame member, and wherein the frame assembly is configured to permit rotation of the optical unit about at least a first rotational axis and a second rotational axis; and
      ii) a motor assembly coupled to the frame assembly, wherein the motor assembly is configured to drive the frame assembly in response to a signal provided by the inertial measurement unit so as to permit rotation of the optical unit about at least the first rotational axis and the second rotational axis, and wherein a motor of the motor assembly utilizes 5 Watts or less to drive a corresponding frame member of the frame assembly.

2. The aerial vehicle of claim 1, wherein the optical unit is configured to communicate wirelessly with the non-optical unit.

3. The aerial vehicle of claim 1, wherein the optical unit is configured to communicate with the non-optical unit via at least one of the following: electromagnetic telecommunications, light, magnetic fields, or electric fields.

4. The aerial vehicle of claim 3, wherein the optical unit is configured to communicate with the non-optical unit via radio communications or infrared communications.

5. The aerial vehicle of claim 2, wherein the optical unit is configured to communicate with the non-optical unit via point-to-point or point-to-multi-point wireless networking.

6. The aerial vehicle of claim 1, wherein the second housing is external to the vehicle body.

7. The aerial vehicle of claim 6, wherein the second housing is separable from the vehicle body.

8. The aerial vehicle of claim 1, wherein the frame assembly comprises a third frame member that bears weight of the second frame member and the first frame member, and wherein the frame assembly is further configured to permit rotation of the optical unit about a third rotational axis.

9. The aerial vehicle of claim 8, wherein at least one of the first rotational axis, second rotational axis, or third rotational axis is a roll axis of the optical unit.

10. The aerial vehicle of claim 1, wherein the motor assembly consumes a minimum amount of energy that is 80% or less than a minimum amount of energy required by the motor assembly to drive a frame assembly supporting both the optical unit and the non-optical unit.

11. The aerial vehicle of claim 1, wherein the optical unit comprises a maximum dimension of about 3 cm or less.

12. The aerial vehicle of claim 1, wherein the optical unit weighs 15 grams or less.

13. The aerial vehicle of claim 1, wherein the aerial vehicle is an unmanned aerial vehicle.

14. The aerial vehicle of claim 1, further comprising one or more shock absorbers, wherein the one or more shock absorbers are positioned between the frame assembly and the vehicle body.

15. The aerial vehicle of claim 1, wherein the optical unit and the non-optical unit constitute the imaging device in its entirety.

16. The aerial vehicle of claim 1, wherein the non-optical unit is not mechanically coupled to the optical unit.

17. The aerial vehicle of claim 1, wherein the second housing comprises a memory device.

18. The aerial vehicle of claim 1, wherein the first housing comprises a removable memory device.

19. The aerial vehicle of claim 1, wherein the optical unit does not comprise a power supply for powering the photosensor, a processor for processing an image captured by the photosensor, or a memory device for storing the image.

20. A method of stabilizing at least a portion of an imaging device, said method comprising: providing the aerial vehicle of claim 1; and supporting the optical unit with the frame assembly, thereby stabilizing the optical unit, without supporting the non-optical unit with the frame assembly.

* * * * *